Figure 1A:
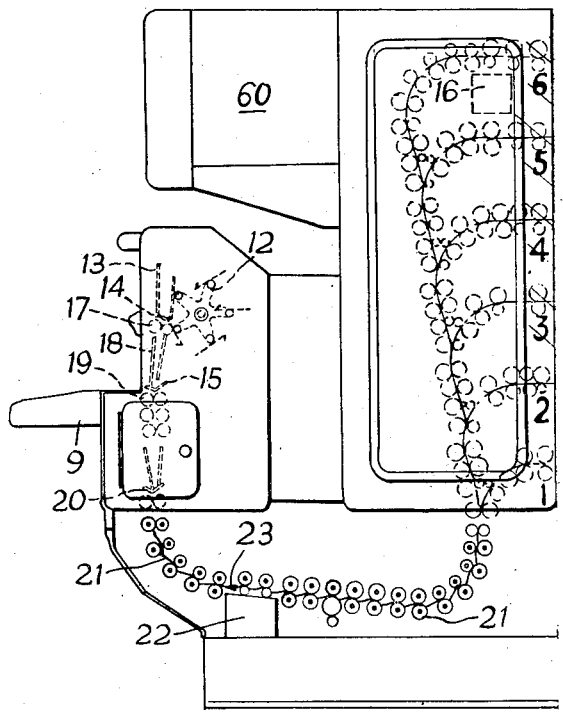

March 31, 1964  H. OSBORN ETAL  3,127,030
LETTER-SORTING MACHINE
Filed Aug. 2, 1960  23 Sheets-Sheet 1

Howard Osborn,
Bernard E. Giles,
Robert E. Preen &
Frederick C.D. Streeter
INVENTOR BY
Watson, Cole, Grindle & Watson
ATTORNEY

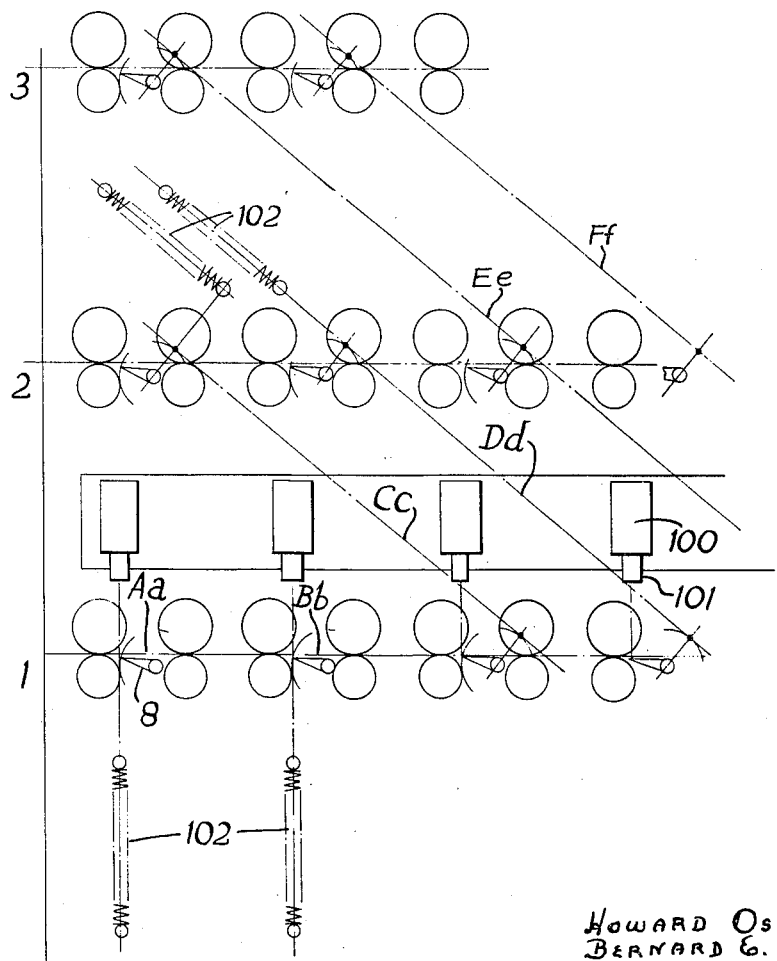

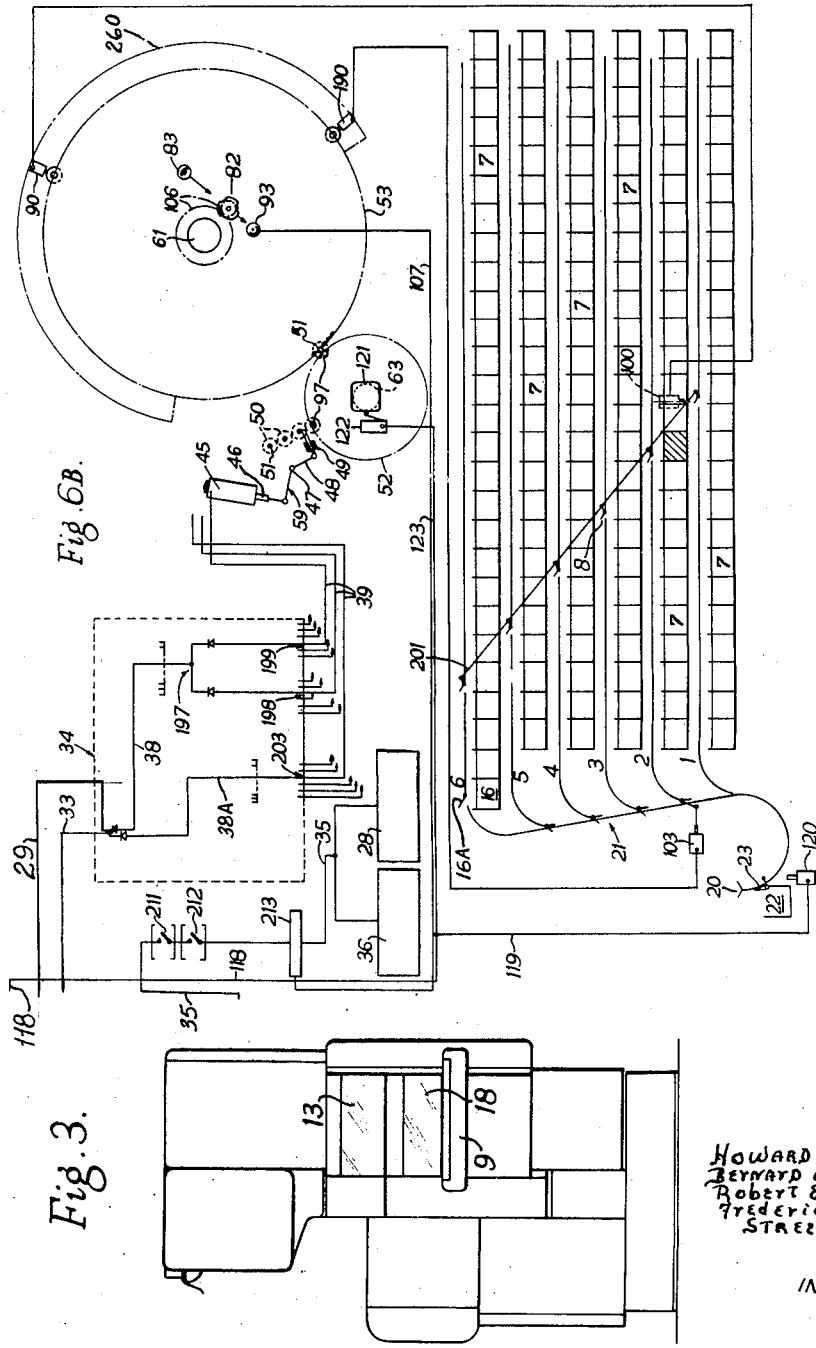

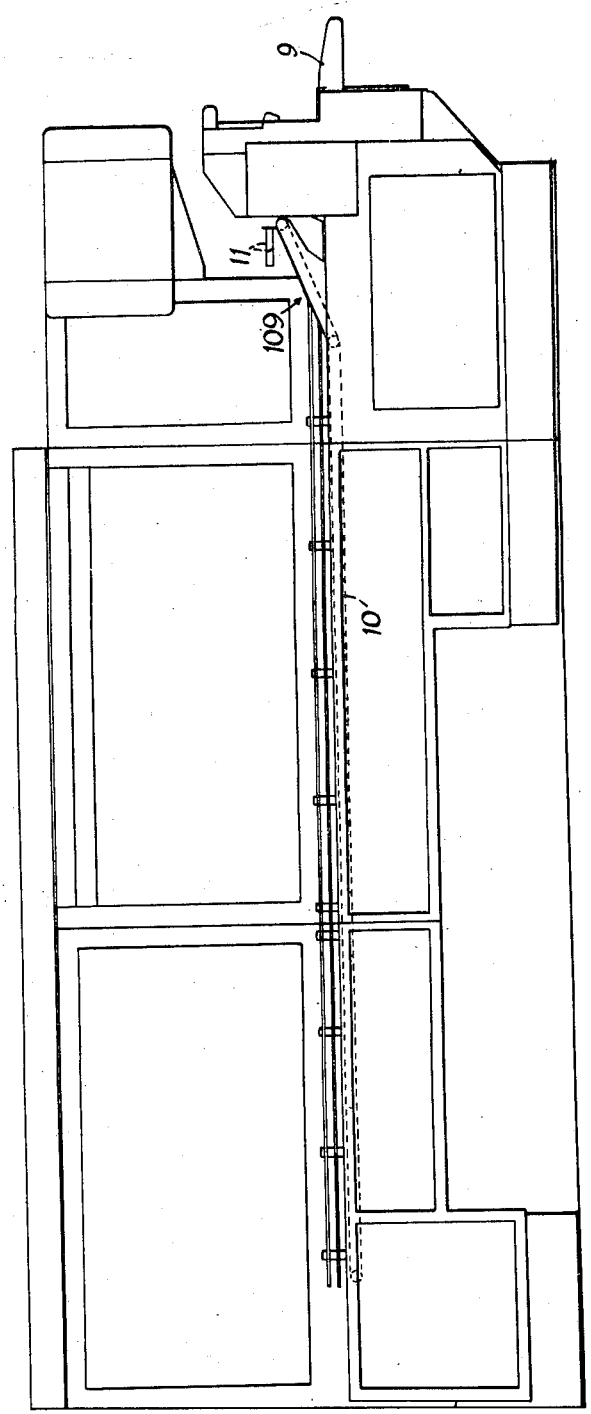

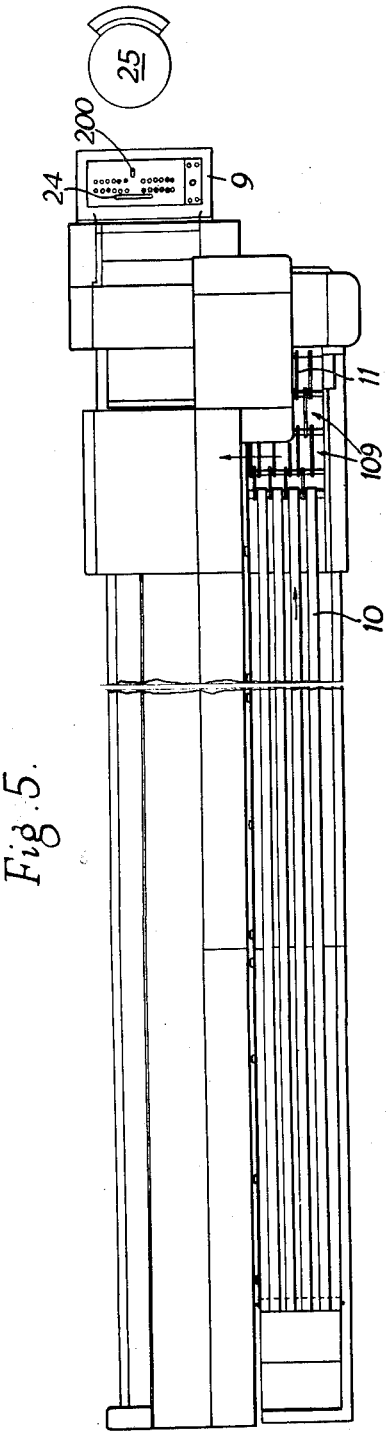

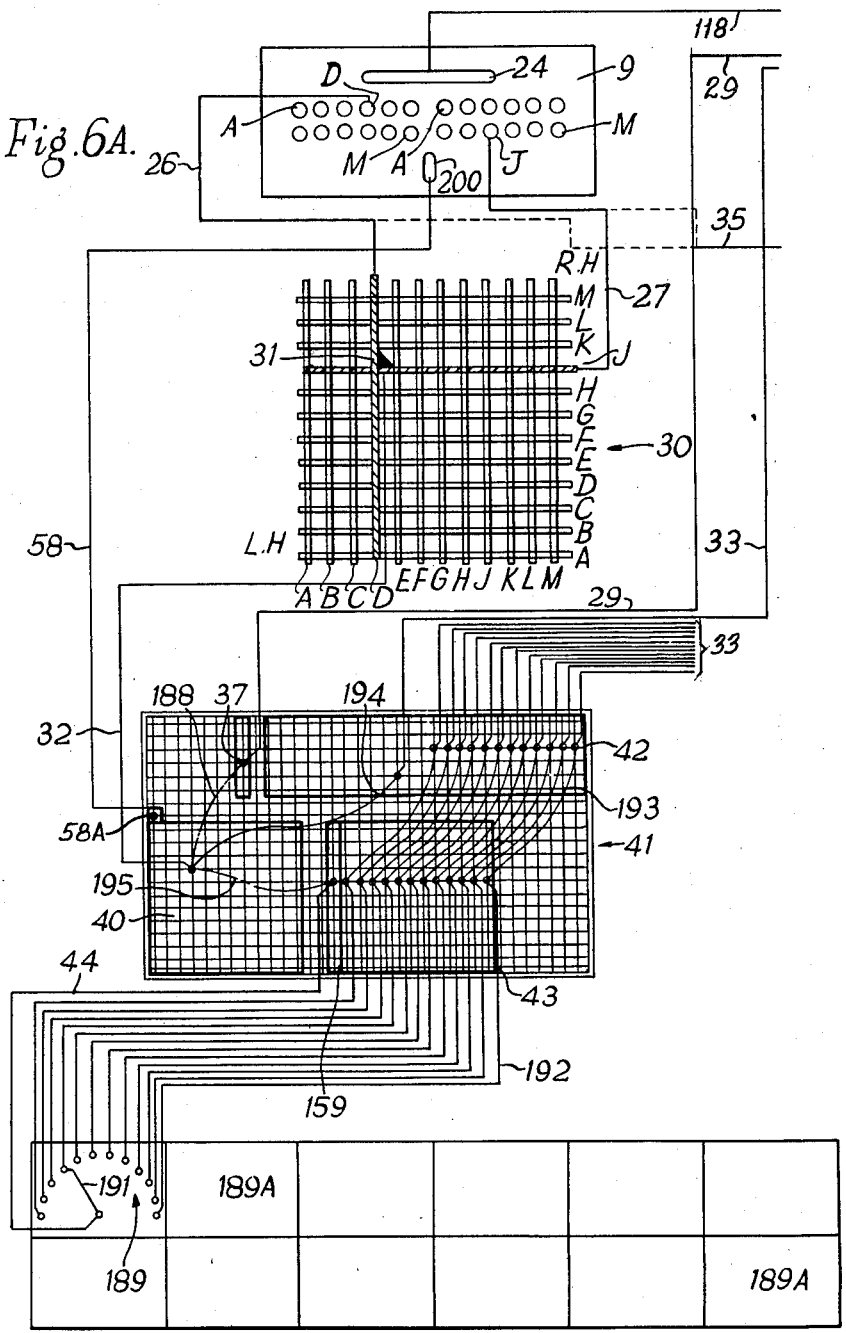

March 31, 1964   H. OSBORN ETAL   3,127,030
LETTER-SORTING MACHINE
Filed Aug. 2, 1960   23 Sheets-Sheet 9

March 31, 1964
H. OSBORN ETAL
3,127,030
LETTER-SORTING MACHINE
Filed Aug. 2, 1960
23 Sheets-Sheet 11
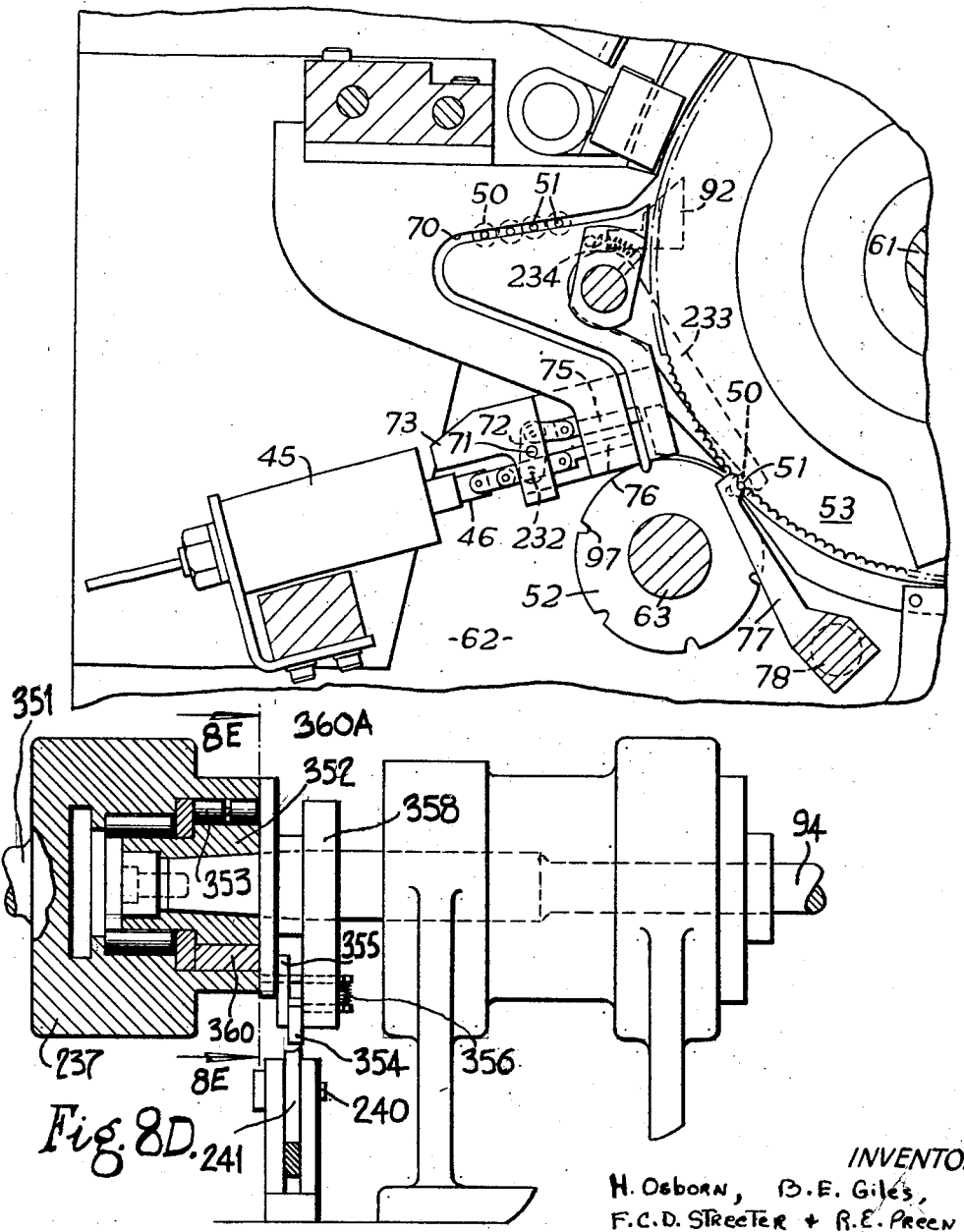

March 31, 1964 H. OSBORN ETAL 3,127,030
LETTER-SORTING MACHINE
Filed Aug. 2, 1960 23 Sheets-Sheet 12

INVENTORS
H. Osborn, B.E. Giles
F.C.D. Streeter + R.E. Preen
BY
Watson, Cole, Grindle + Watson
ATTORNEY

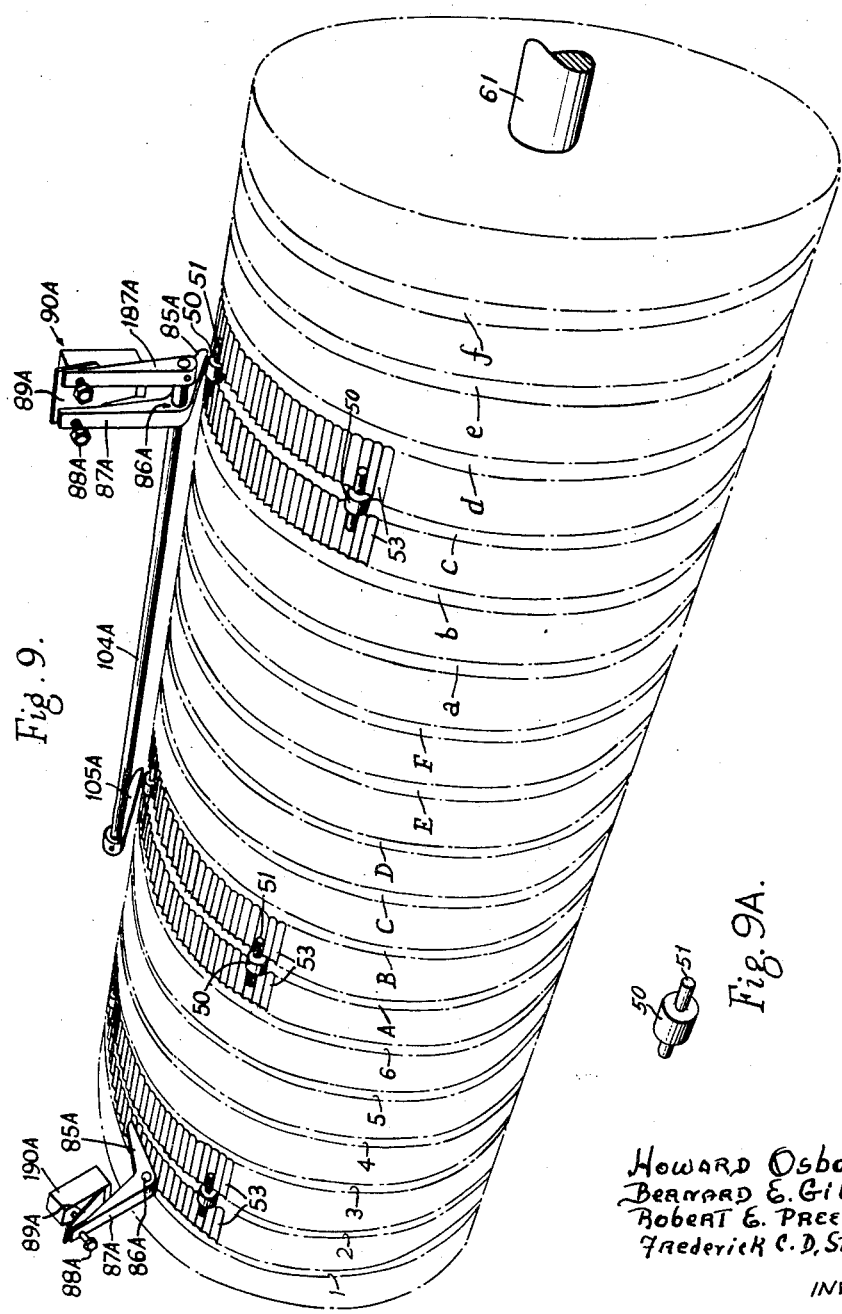

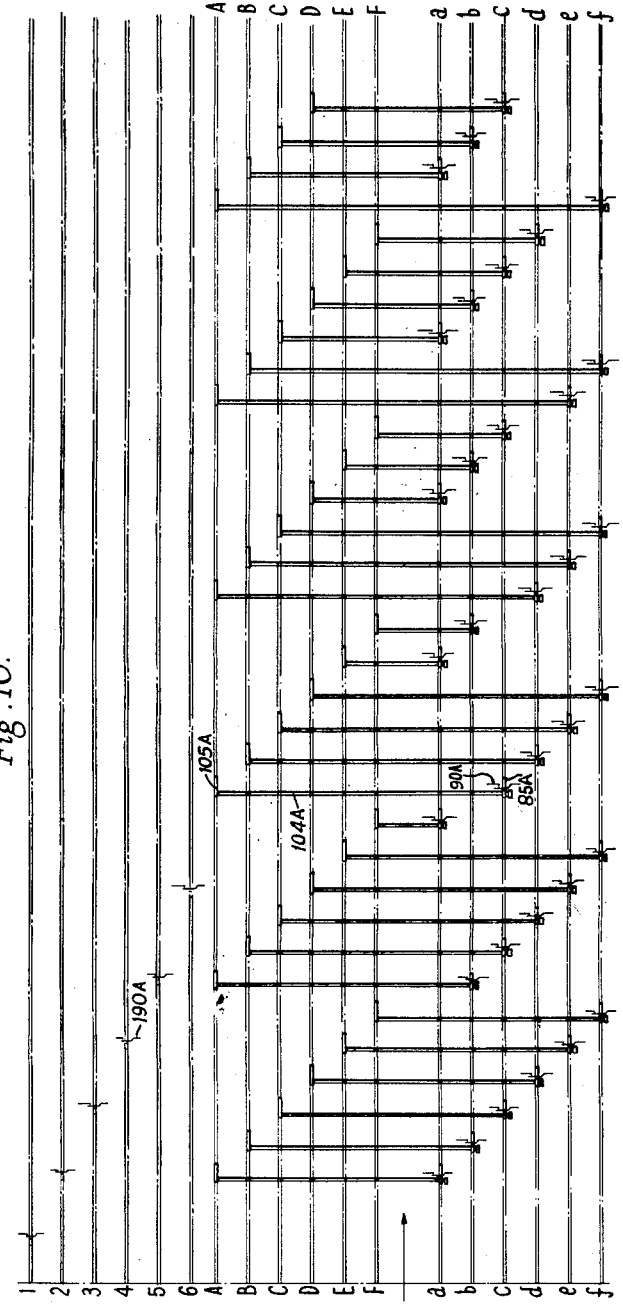

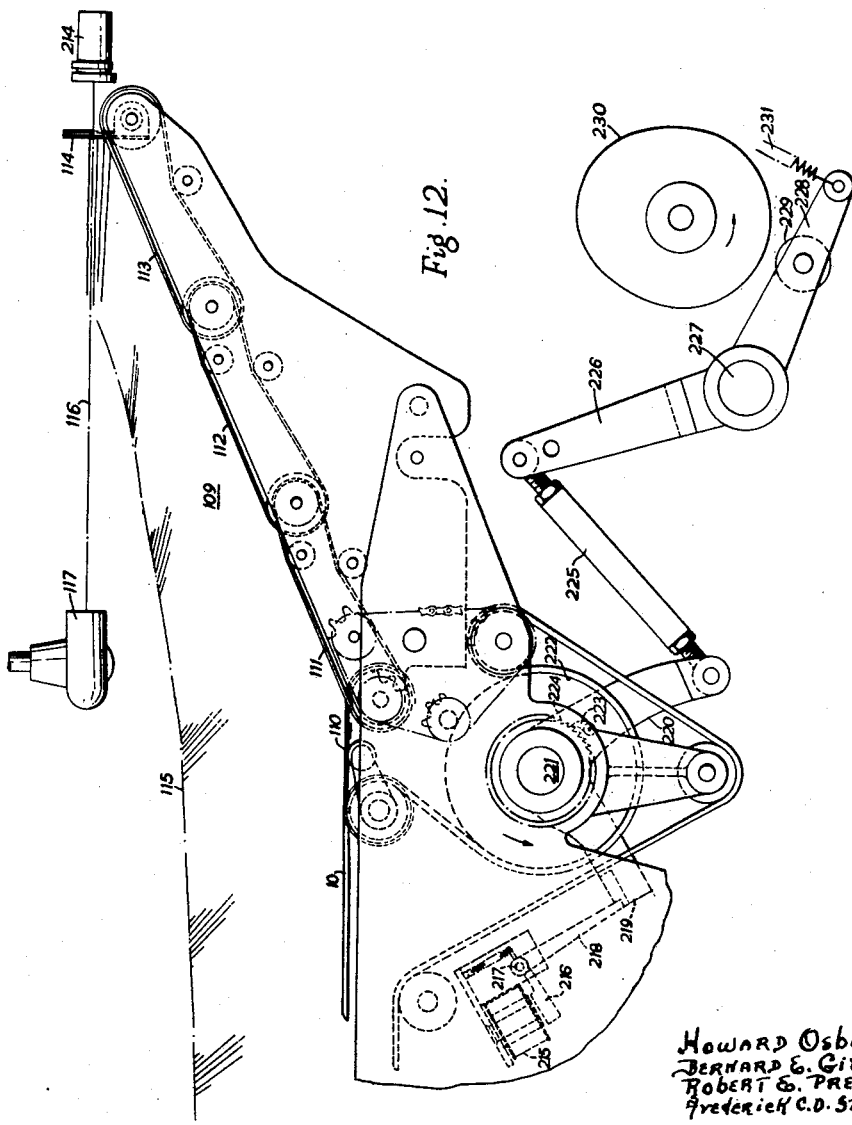

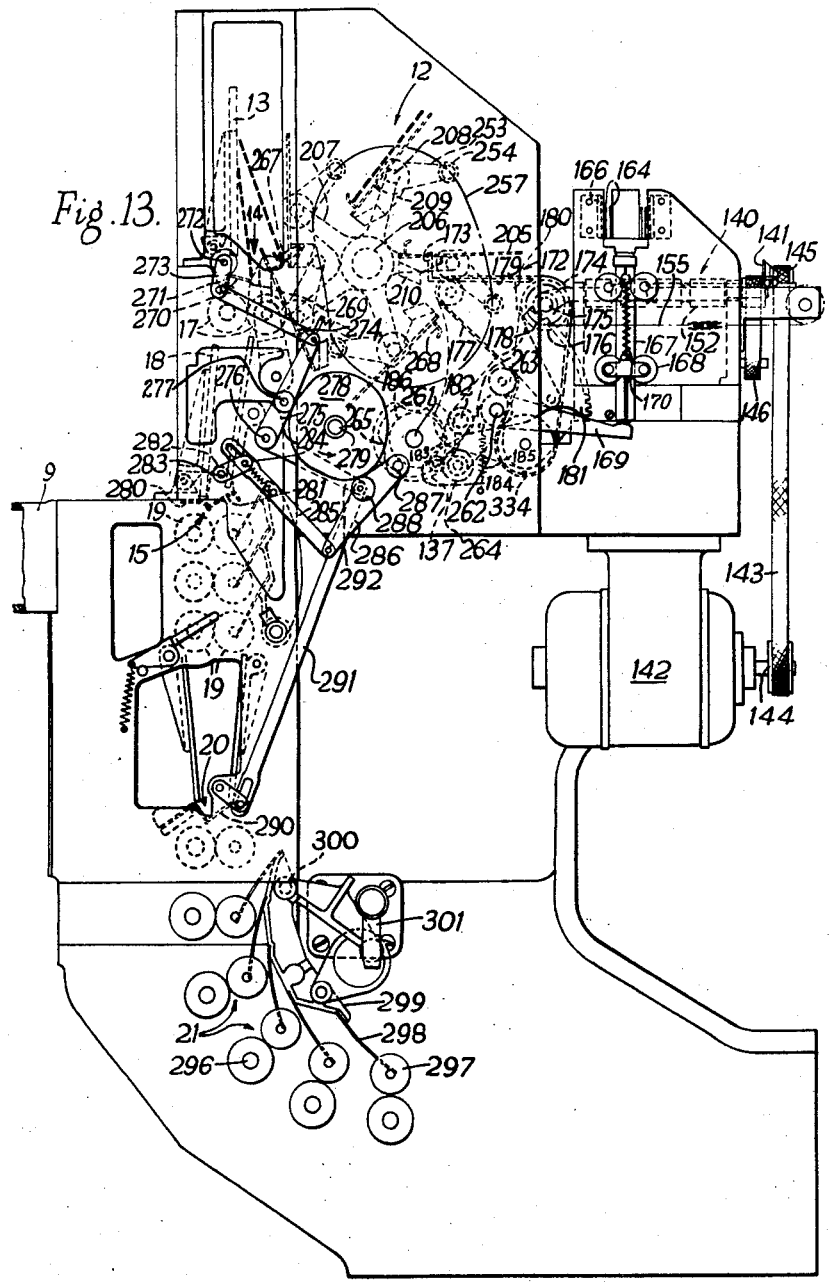

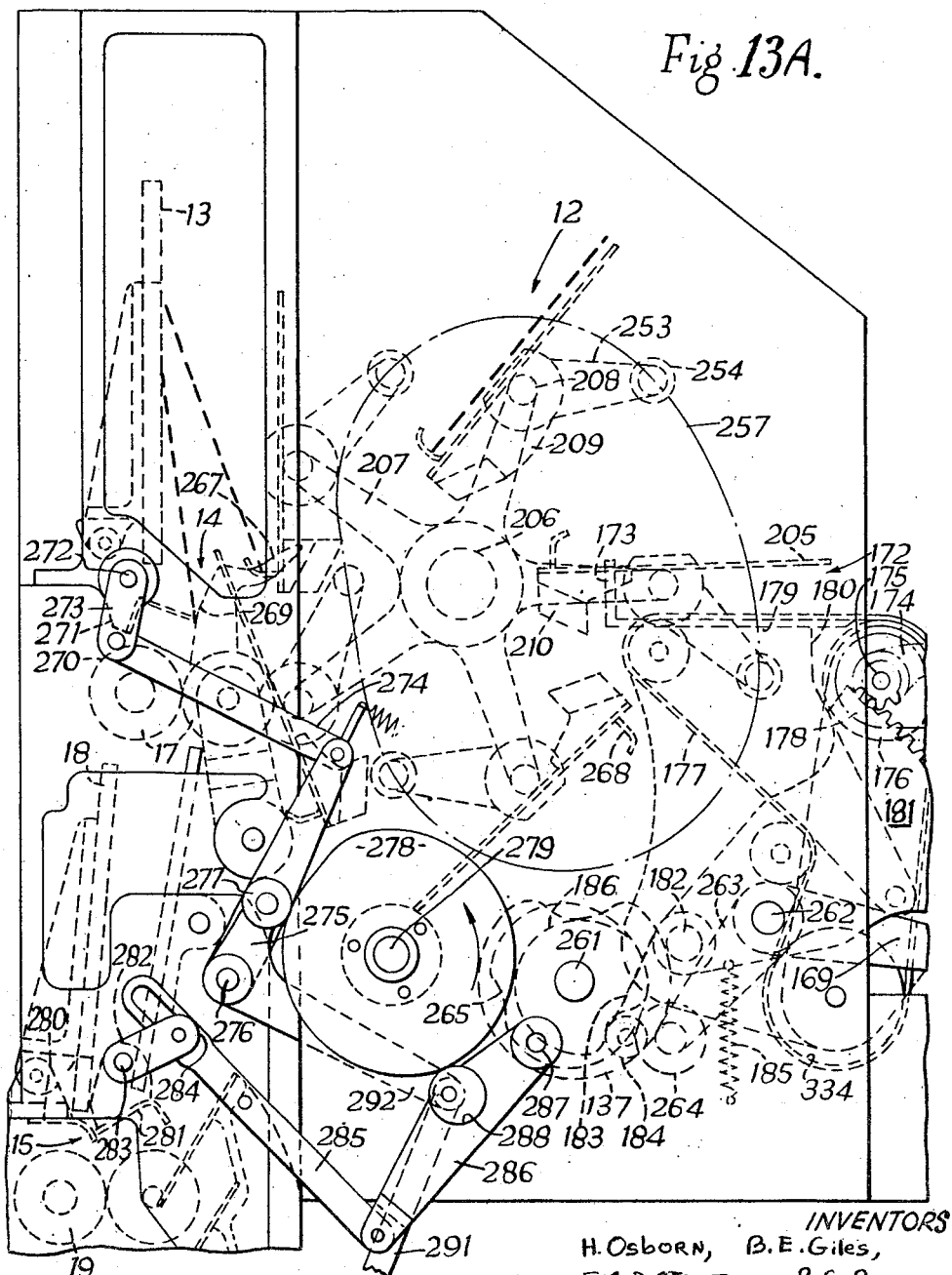

March 31, 1964   H. OSBORN ETAL   3,127,030
LETTER-SORTING MACHINE
Filed Aug. 2, 1960   23 Sheets-Sheet 18

Howard Osborn,
Bernard E. Giles,
Robert G. Preen +
Frederick C.D. Streeter
INVENTORS BY
Watson, Cole, Grindle & Watson
ATTORNEYS

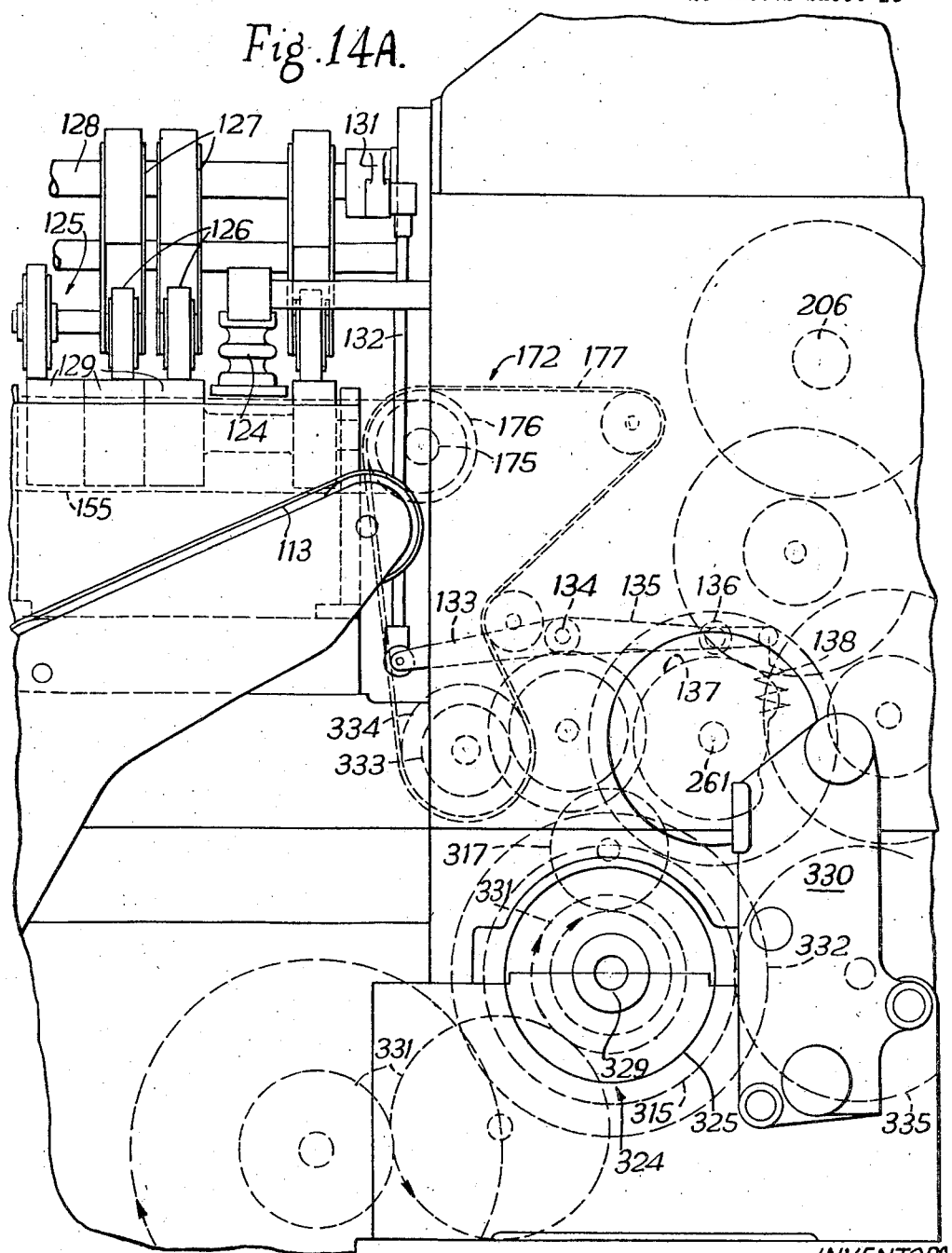

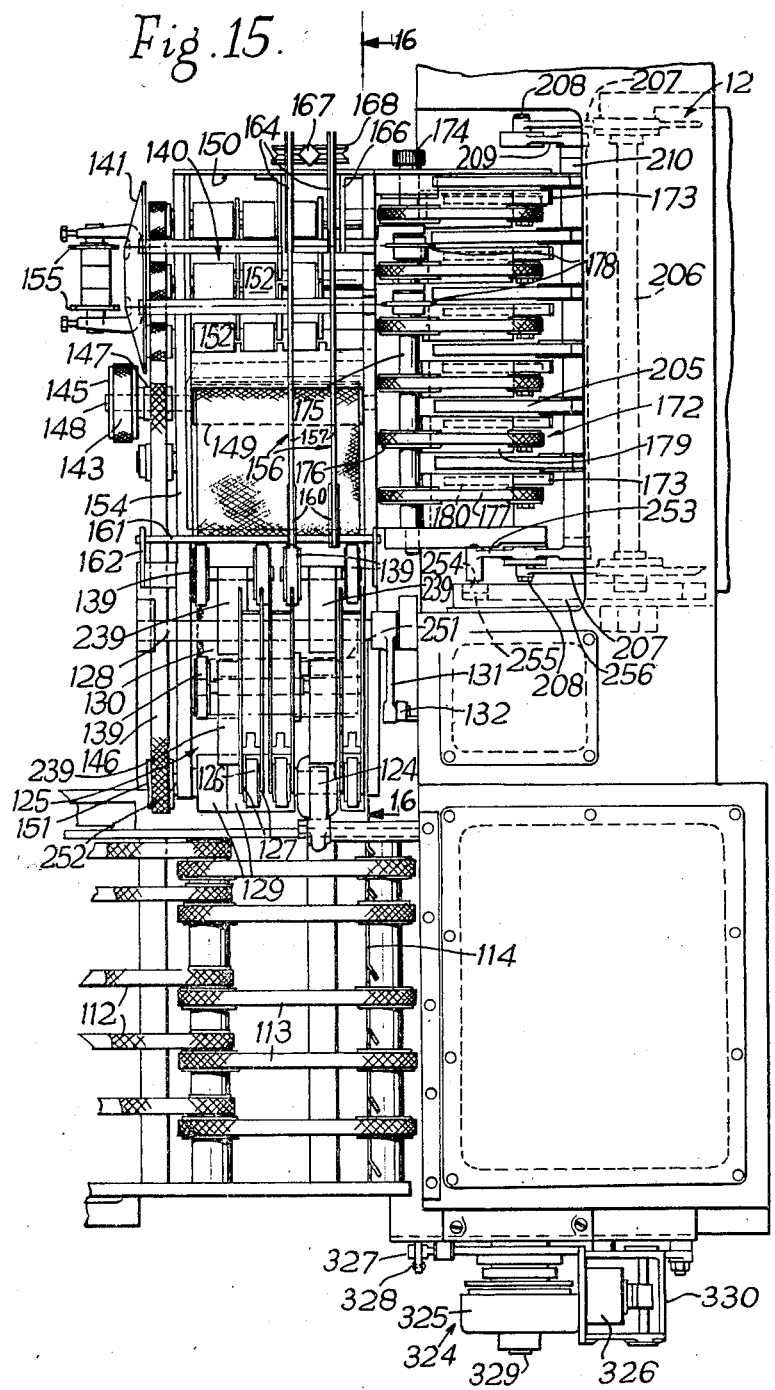

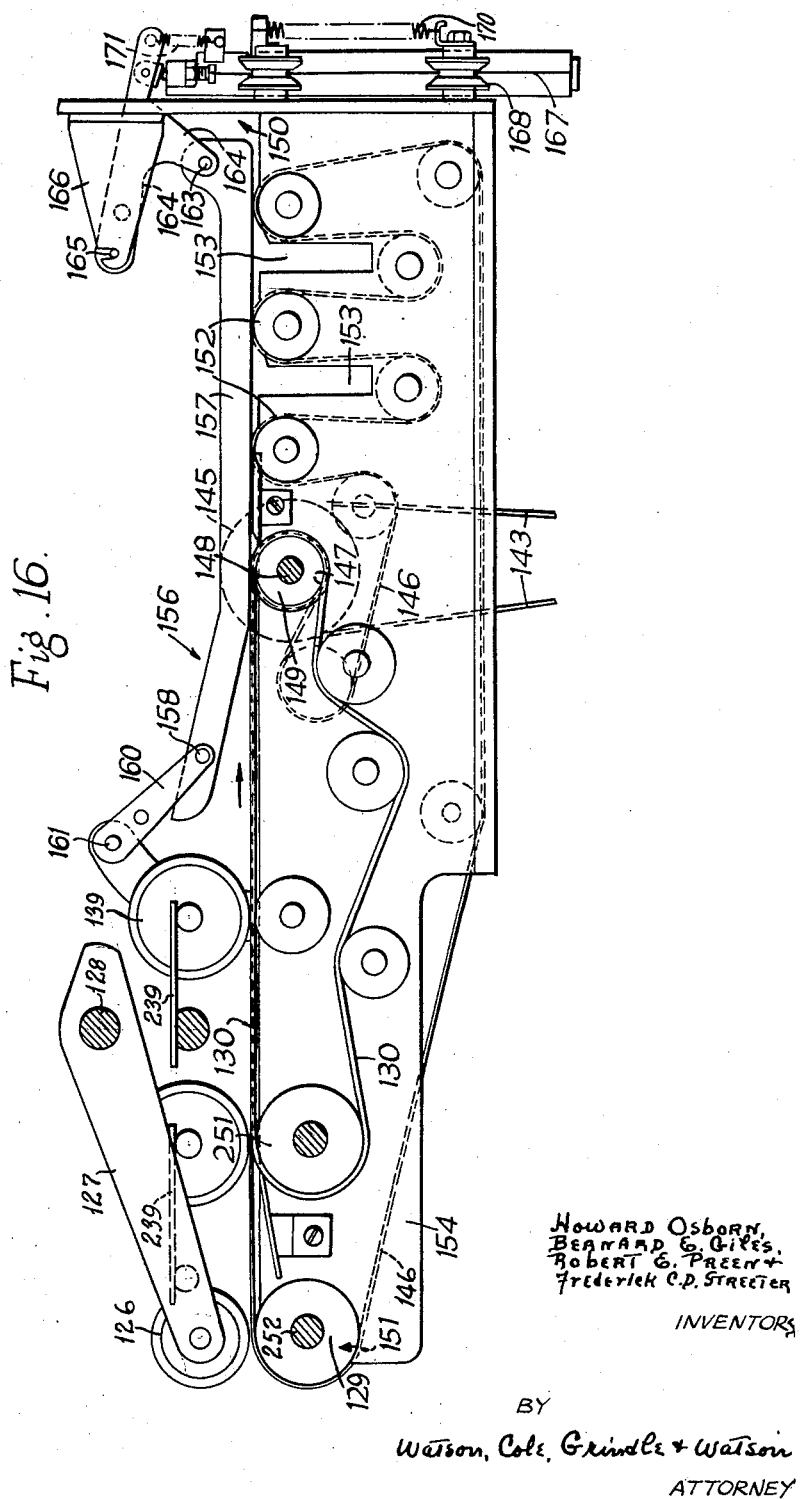

March 31, 1964  H. OSBORN ETAL  3,127,030
LETTER-SORTING MACHINE
Filed Aug. 2, 1960  23 Sheets-Sheet 22

Howard Osborn,
Bernard E. Giles,
Robert G. Preen,
Frederick C.D. Streeter
INVENTORS BY
Watson, Cole, Grindle + Watson
ATTORNEY

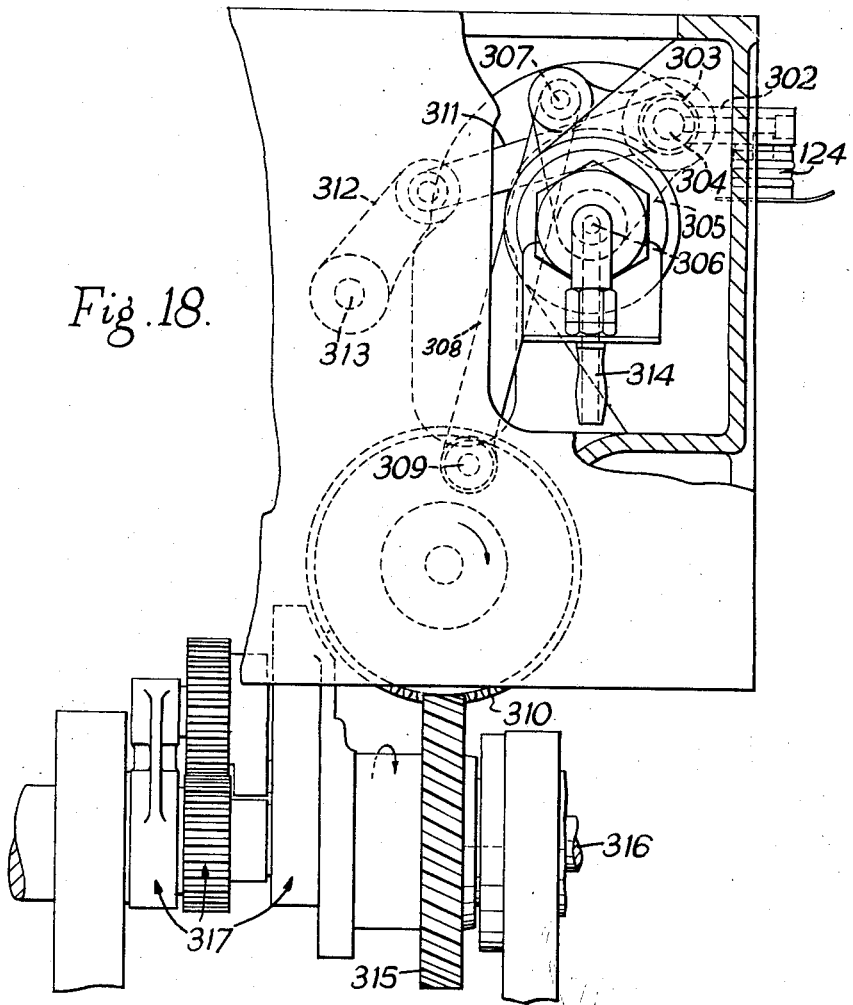

United States Patent Office 3,127,030
Patented Mar. 31, 1964

3,127,030
LETTER-SORTING MACHINE
Howard Osborn and Bernard Elwyn Giles, Bristol, Robert Ernest Preen, Radlett, and Frederick Charles David Streeter, Bristol, England, assignors to The Thrissell Engineering Co. Ltd., a British company
Filed Aug. 2, 1960, Ser. No. 47,057
Claims priority, application Great Britain Aug. 4, 1959
9 Claims. (Cl. 214—11)

This invention concerns a new or improved letter sorting machine.

Letter sorting machines are known comprising a system of superimposed conveyors which run along over a number of boxes or compartments into which letters are discharged from the conveyors. Letters fed to the machine are diverted into the several conveyor paths by devices operated according to a code fed to the machine following the manipulation of a key board. The code also determines into which compartment along a row beneath any one conveyor a letter is to be diverted.

In some known machines there is associated with each row a timing or delay device often called a "memory" and usually consisting of a continuously rotating drum having a number of displaceable elements such as pins uniformly spaced on a circle concentric with the axis of rotation. Each pin can be displaced on receipt of a suitable electrical signal so that a displaced pin eventually operates a lever which causes a passing letter to be diverted into the conveyor system of a particular row, and a similar arrangement associated with each compartment causes the letter to be delivered into the correct compartment along said row. Eventually a displaced pin is restored to its normal position. It will be understood that the time delay possible with such a device depends on the number of pins which can be used and unless the drums are made very large the scope of such a device is limited. Moreover a device of this kind is necessary for each compartment and for each row. This makes a machine unnecessarily complex and expensive.

The conveyors mentioned above move continuously at a uniform rate but the keypressing is performed at a random rate since some addresses are poorly written or letters are curiously addressed, and sometimes a remote place only is given as the address and the operator in such case takes longer to think of the appropriate code. Therefore it is necessary that after keypressing the entry of the letter to the conveyor systems feeding the rows and the compartments shall be synchronised with the rate of movement of the systems and also because the timing drum devices are associated with said systems. Moreover, with some devices the drum pins are displaced or "set" by a sloping cam which has to be projected between two neighbouring pins so that a pin can ride on the slope to be displaced and it is necessary to wait for a drum to be in a suitable position before the cam can be projected between two pins. In any construction a pin can only be displaced during a very short interval of time.

It will be understood from the preceding paragraph that as there is no definite relationship in time between a signal and the ultimate operation desired it is necessary to introduce some further delay device into the system so that a pin can be displaced after a signal is made although the displacement can only take place when a pin is in a definite angular position during the rotation of the drum. In other words the timing device is of a rhythmic nature and this is a great disadvantage.

The present invention is intended to overcome both these drawbacks by providing devices equivalent in function to said pins which are available in any number necessary and further can be set into motion at a definite distance from the point at which they are to cause the operation of whatever devices may be necessary, and by utilising the starting movement of the said devices to release a letter to the conveying systems at the same instant.

Machines of the kind briefly outlined above are discussed in some detail in United States Patent No. 3,018,009 where it will be seen that the control system of the machine requires large numbers of electronic tubes and other electronic devices to secure the necessary time delays and cause the mechanical parts of the machine to operate in the desired manner as determined by the keyboard. In said specification some improvement in simplifying the machine was effected and it is desired to further simplify such machines. As will appear later the present invention enables a considerable amount of the electronic apparatus to be dispensed with and further the difficulty due to the use of rhythmic memories, such as the rotating drum delay devices, is avoided.

While the superimposed conveyor arrangement mentioned at the beginning of this specification is probably the best way of building such a machine other arrangements are conceivable, the essential feature being that letters moving on one conveyor shall be distributed to the other conveyors in accordance with the destination of each letter; said other conveyors each receiving letters for a particular group of destinations.

The invention provides a letter sorting machine in which letters are coded according to their destinations and fed one at a time to a gate which opens to deliver each letter to a first conveyor arranged to carry the letters singly in succession. Means are provided to selectively feed each letter to one of at least two further conveyors provided with diverters which operate to cause each letter to be discharged from the further conveyor by the diverter at a position depending on the destination of the particular letter. The operating means for the diverter includes a time-delay device set into operation at the time the gate opens and it is arranged to delay the diverter operation by a time equal to the transit time of the letter from the gate to the diverter. Common means are provided for simultaneously operating those diverters which are located at the same distance from the gate, as measured by the transit time, whereby a letter on one of the further conveyors is discharged at its proper position by the appropriate diverter on that conveyor, while any diverter simultaneously operated makes an idle movement. In this way, particularly when there are several such further conveyors, the construction of the machine is simplified.

Where a two-symbol code, such as two letters, is used to cause operation of a diverter for a given letter destination, each diverter-operating means includes an electromagnet and a switch. The time delay is provided by feeding two switch-operating elements from one magazine of each of two groups of magazines, one element for each symbol of the code to conveyors which convey these elements to positions where they jointly operate a switch to energize the magnet. Means are provided for simultaneously delivering the elements to the respective conveyors at the instant the gate opens. Each switch is positioned such that the transit time of the elements from the instant they are taken by the conveyor to the positions is equal to the transit time of a letter from the gate to its appropriate diverter on one of the further conveyors.

The switch-operating elements may be in the form of small rollers and the feeder for feeding such an element from a magazine may comprise a conveyor such as a slotted rotatable disc suitably shaped to receive and convey such roller from the magazine to the conveyor which is to receive and convey the roller to cause said time delay. Where the machines are controlled by a manual keyboard which effects the coding signal it happens at times that an operator can code another letter more quickly than the conveyor which is eventually to receive and convey the switch-operating element can accept it. It is obviously not expedient to compel an operator to work in time with his machine, particularly as all letters cannot be read and coded in precisely the same time and to meet these requirements, devices are provided to release such element from the magazine to the feeder but the latter does not feed the element onwards until its normal instant for so doing.

In the specific embodiment described later the machine is manually-operated and has a keyboard, the keys whereof are arranged in two groups and signals are made by pressing a key from each group, said machine comprising a translator whereby the two separate signals resulting from the pressing of the two keys may be combined to cause operation of a single device such as an electric switch, said translator comprising a switch for each key in each group and responsive to the pressing of said key to make electrical contact, a set of relays equal in number to the product of the number of keys in each group, an electrical connection from each switch to one side of a number of said relays equal to the number of keys in the other group, a source of electrical power one pole of which is connected to contacts of the switches of one group and the other pole of which is connected to the contacts of the switches of the other group whereby when a key is pressed in each group one relay only is energised so that the two separate signals one from each key are combined to energise the one relay. Thus an arrangement of twelve switches per key group can be arranged to cause energisation of any one of one hundred and forty-four relays. It will be apparent that the relay energised has become the source of a single signal representing a code formed by the combination of the two keys pressed.

The signal may be used to cause the operation of a single-revolution clutch which drives mechanism to feed letters in succession through various parts of the machine where letters are coded and eventually discharged to the conveyor which selectively feeds other conveyors, as above recited, and the signal also starts another single-revolution clutch which drives devices for feeding the switch-operating elements and causing their transfer to the conveyor which provides the aforesaid time delay.

Since, as will be clearer later, the transfer of such element occurs at a particular point in the single revolution while the conveyor to receive them moves continuously it is necessary to ensure that the transfer occurs at a precise conveyor position and this is ensured by scanning the said conveyor with a photo-cell and controlling the starting instant of the single revolution clutch by the resulting signal.

Figure 1B:
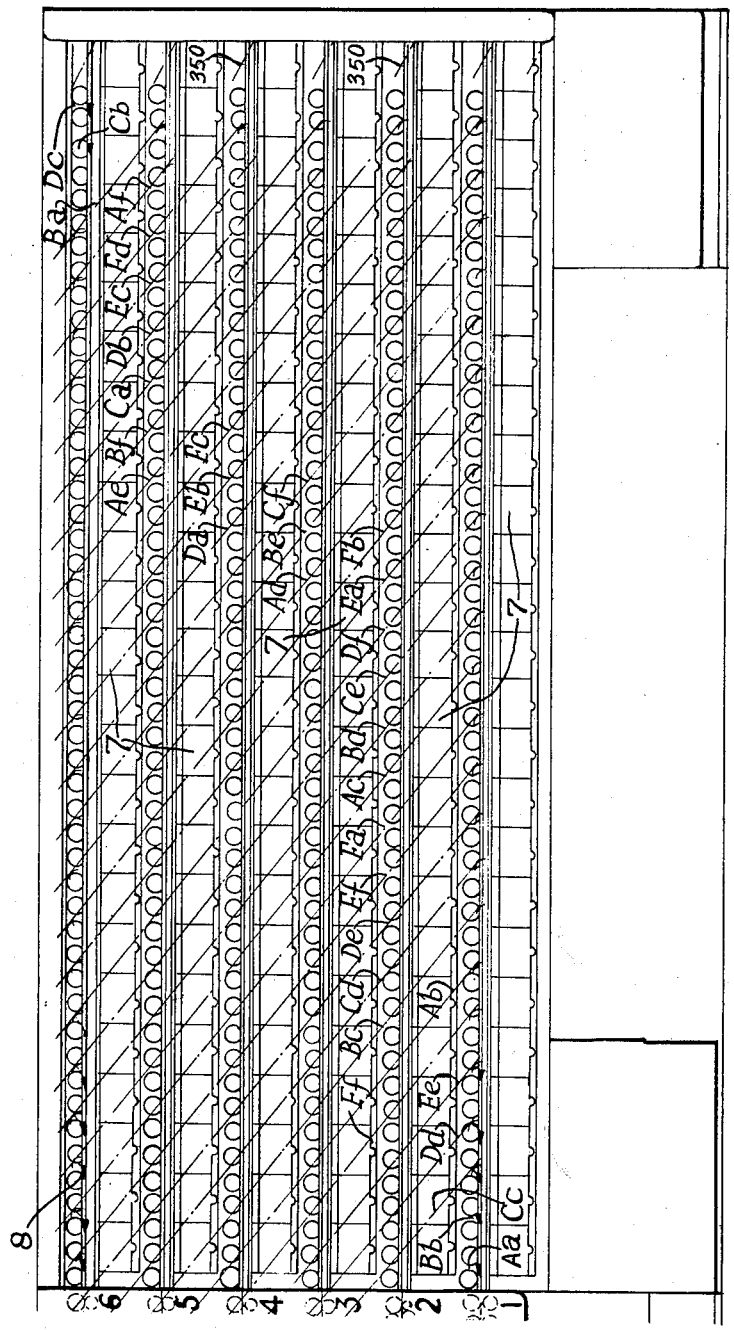
Figure 7:
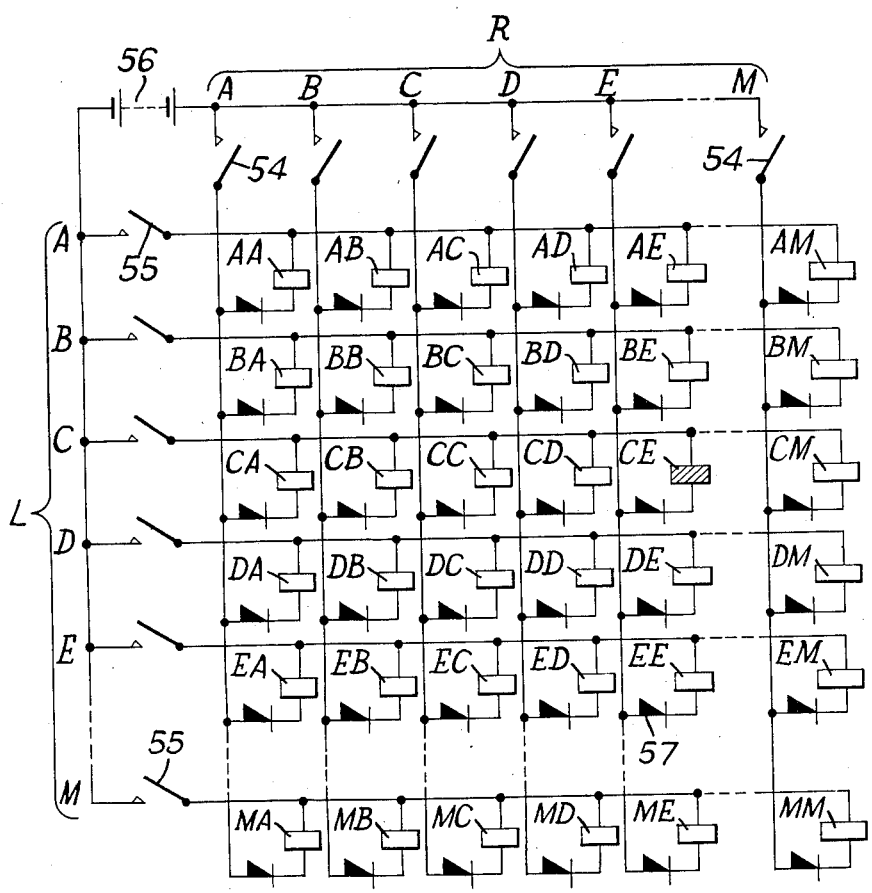
Figure 8A:
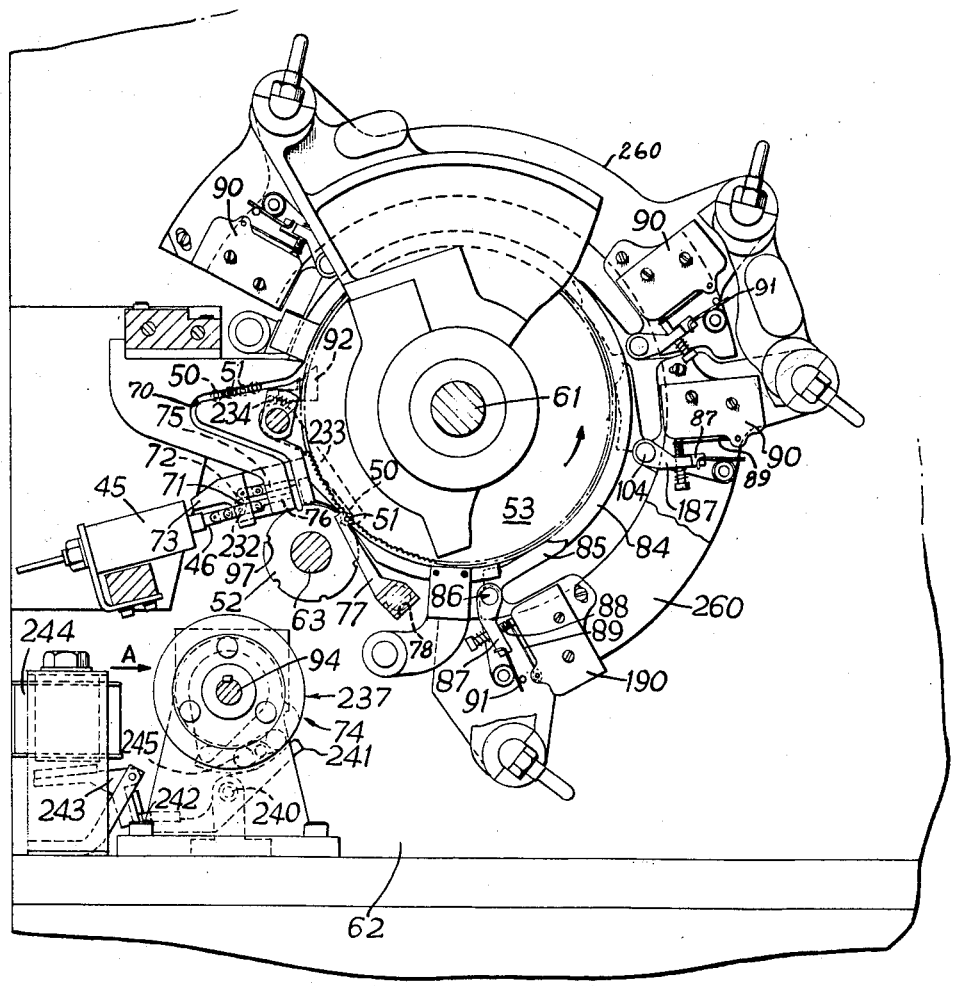
Figure 8B:
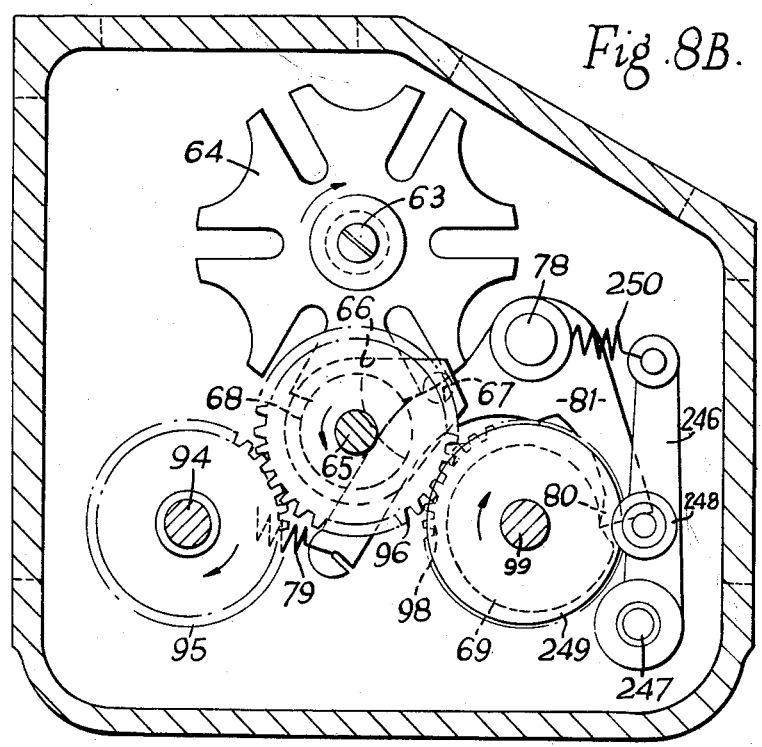
Figure 8C:
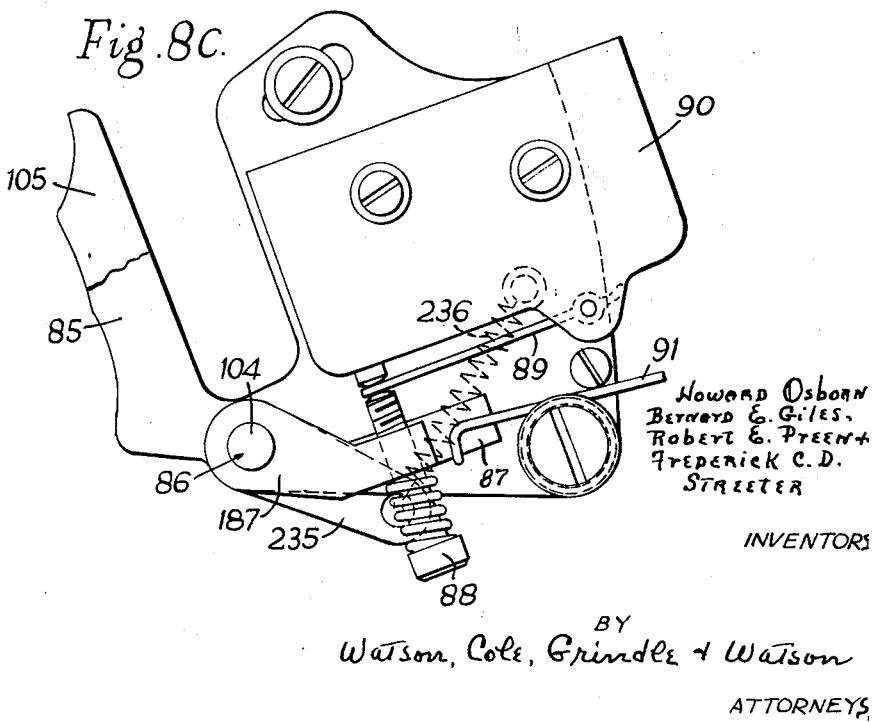
Figure 13B:
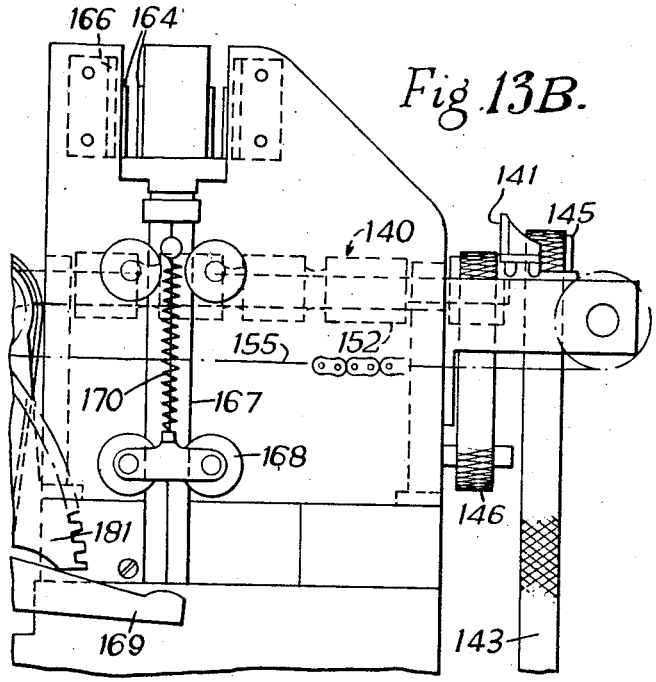
Figure 13C:
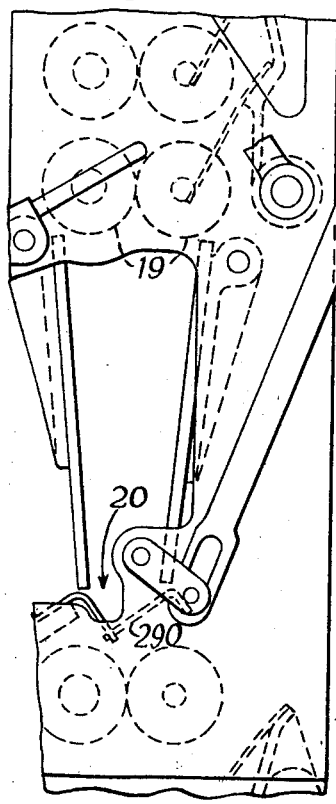
Figure 8E:
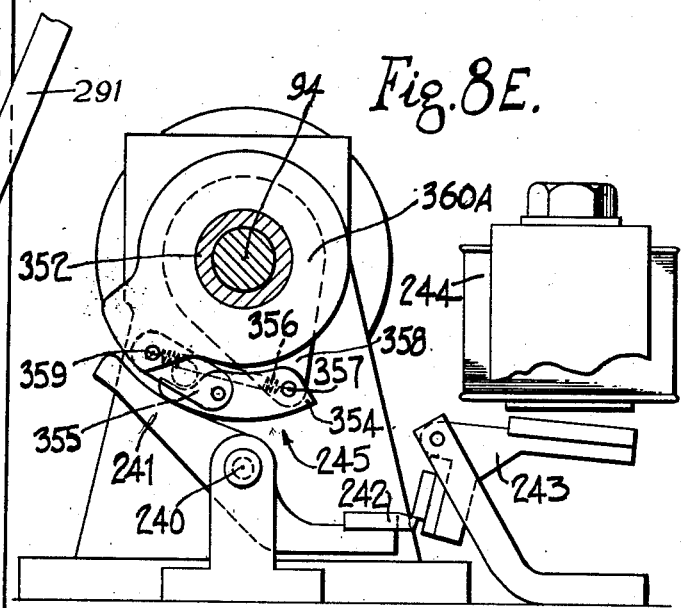
Figure 14:
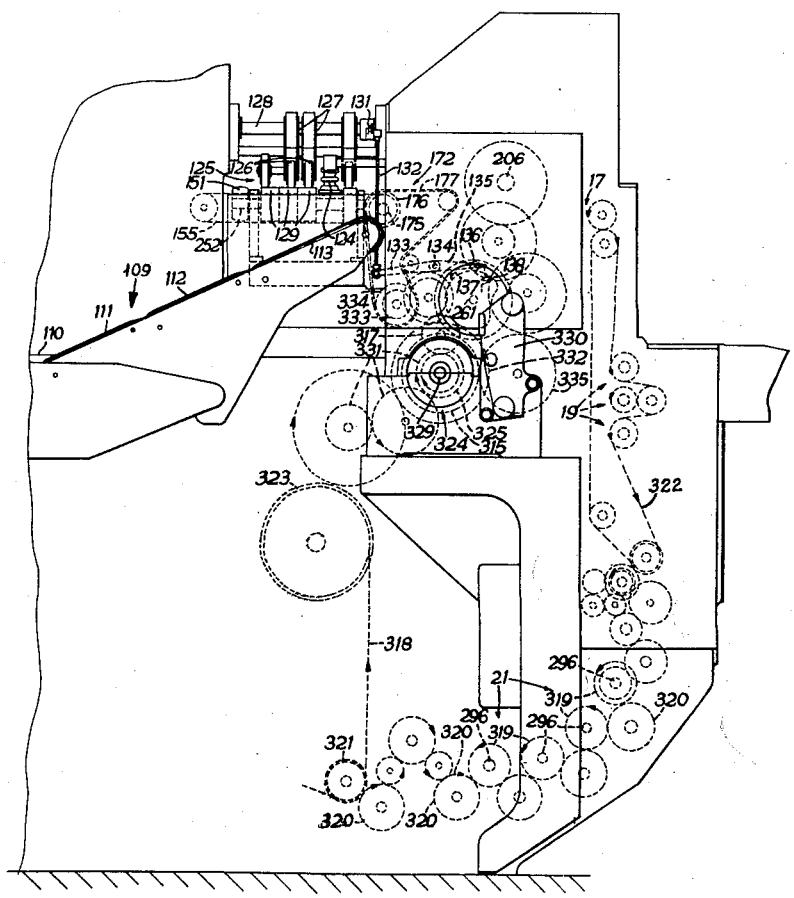
Figure 17:
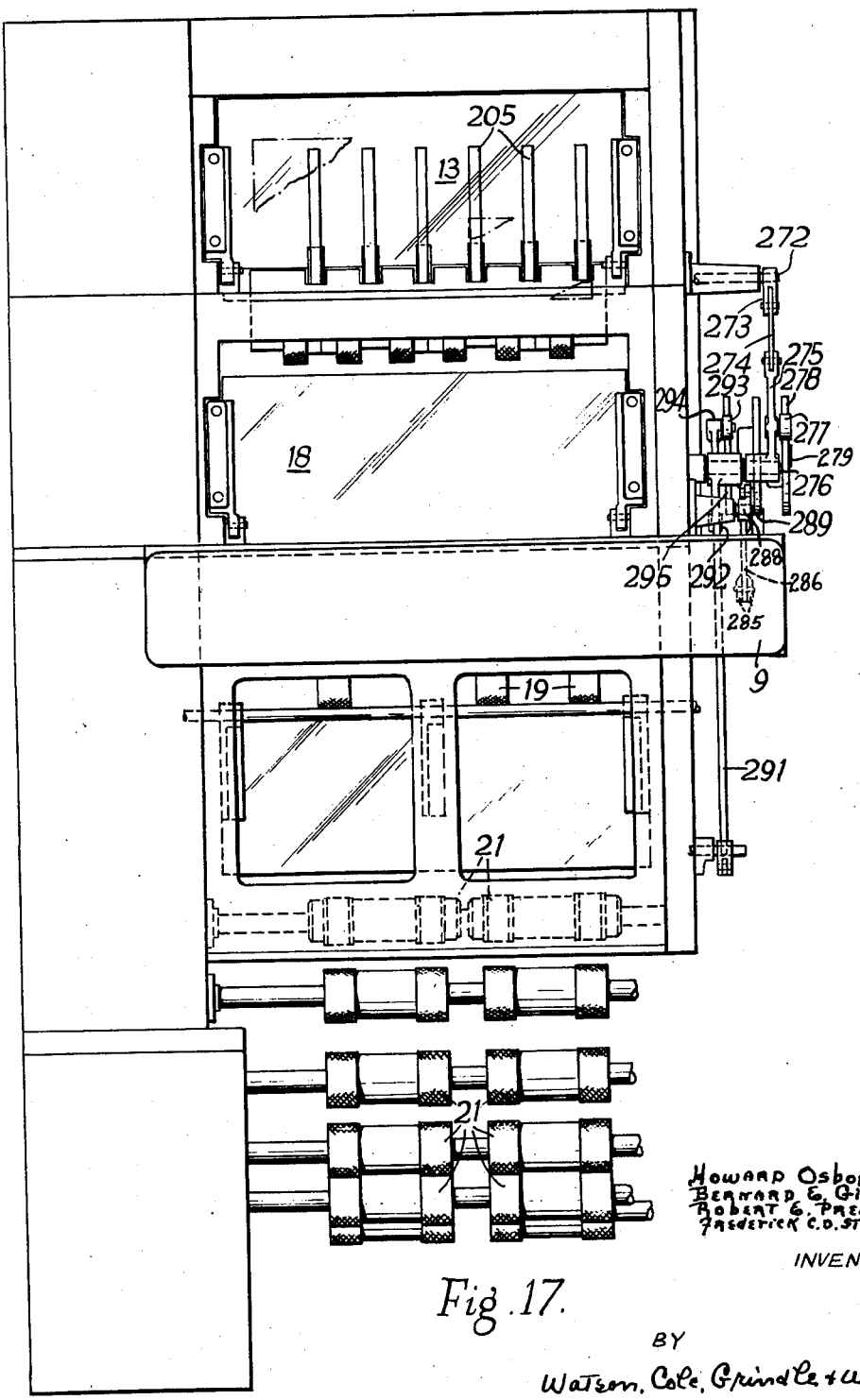

A construction according to the invention will be described with references to the accompanying drawings, in which:

FIGURES 1A and 1B together constitute a diagrammatic side elevation of one side of the machine, the box side, FIGURE 2 is a fragment of FIGURE 1B drawn to a larger scale and showing box diverter details, FIGURE 3 is an elevation of one end of the machine, the operating end, FIGURE 4 is a side elevation of the other side of the machine, the feed conveyor side, FIGURE 5 is a plan view of FIGURE 4, FIGURES 6A and 6B together constitute a diagram explaining the electrical functions of the machine, FIGURE 7 is a diagram showing details of a translator circuit employed in the machine and indicated diagrammatically in FIGURE 6A, FIGURE 8A is an elevation of a time delay or memory unit, partly broken away and partly in section, FIGURE 8B shows driving devices for parts of the mechanism in FIGURE 8A, these devices coming in front of FIGURE 8A, FIGURE 8C is a large scale view of a switch used in FIGURE 8A, FIGURE 8D is a side view of a clutch shown in FIGURE 8A, looking in the direction of the arrow A, a part being broken away, and partly in section, and FIGURE 8E is a section of FIGURE 8D on the line 8E—8E', and FIGURE 8F is an enlarged fragment of FIGURE 8A, FIGURE 9 is a perspective diagram of some of the details of the unit shown in FIGURE 8A, to explain a system of operation, FIGURE 9A is a perspective view of a detail shown in FIGURE 9, FIGURE 10 is a diagram explaining the diverter linkage system, FIGURE 11 is a table relating to FIGURES 1A, 1B, and 2, FIGURE 12 is an elevation of a mail feed conveyor, FIGURE 13 is an elevation of part of FIGURE 1A, drawn to a larger scale and showing letter viewing windows, a waiting gate and a paddle wheel and other devices for bringing a letter in front of the operator, FIGURES 13A, 13B and 13C are views of portions of FIGURE 13, drawn to a larger scale, FIGURE 14 is an elevation taken in the opposite direction to FIGURE 13 and showing the gearing for driving parts of FIGURE 13, FIGURE 14A is a view of a portion of FIGURE 14 drawn to a larger scale, FIGURE 15 is a plan looking down on FIGURE 14 and showing letter shifting devices, some of which are shown in elevation in FIGURE 13, FIGURE 16 is a section of FIGURE 15 on the line 16—16, FIGURE 17 is a front view of FIGURE 13 showing the viewing windows, feeding rollers, paddle wheel and other details of FIGURE 13, FIGURE 18 is an elevation, partly in section, of a suction letter transporter and driving mechanism therefor.

An outline of the machine will first be given with reference to FIGURES 1A and 1B and 2 to 5. Six superimposed conveyor systems are shown in FIGURES 1A and 1B, numbered upwards from 1 to 6, see also FIGURE 6B. These conveyors are roller conveyors and may be constructed as described and illustrated in United States Patent No. 2,965,374.

Beneath each conveyor is a row of boxes 7, see also FIGURE 6B, into which letters are sorted as explained hereafter and delivery of a letter into a particular box is effected by a diverter 8 as described in the patent just mentioned. These diverters are shown diagrammatically in FIGURES 1B, 2 and 6B as small wedges.

A keyboard 9, see also FIGURES 3, 4, 5 and 6A, having two sets of keys, one for each hand, has twelve keys per set. Keyboard operation codes a letter to determine which box it is to go to and also starts a single-revolution clutch, see 36 in FIGURE 6B. As explained later when FIGURE 6B is being described the clutch makes one revolution and then stops and during this revolution a number of parts shown in FIGURE 1A are actuated as will now be described. These intermittent revolutions of the clutch will be referred to as "cycles" but as will be readily understood the time interval between successive cycles is not necessarily constant as each cycle is started by the operator when he presses two keys representing a code.

Letters are fed to the machine by a conveyor 10 consisting of several narrow belts, FIGURES 4 and 5 and also FIGURE 12, moving in the direction of the arrows, FIGURE 5, and move up a sloping conveyor system 109 at the keyboard end of the machine, see also FIGURES 12 and 14. When the letters reach approximately the position marked 11 in FIGURES 4 and 5 they are taken one at a time, that is, one per cycle, by a suction device, not shown, in these views but explained later with reference to FIGURES 14, 15 and 18 where the sucker is marked 124, and, after being moved in a direction parallel to the vertical arrow in FIGURE 5, delivered to a rotatable paddle wheel 12, FIGURE 1A, see also FIGURES 13, 13A and 15, whereby each letter is brought in turn that is, one per cycle, to stand behind a viewing window 13, see also FIGURES 3, 13, 13A and 17, from which it moves down at the opening of a gate 14, see also FIGURES 13, 13A, which opens once per cycle, through nip rolls 17, also in FIGURES 13 and 14, to another window, the "key-read window" 18, see also FIGURES 3, 13, 13a and 17, so called for reasons given later.

The next operation or cycle releases the letter through a gate 15, see also FIGURES 13 and 13A, into a small continuously driven conveyor roller system 19 which carries it to a lower waiting gate 20, see also FIGURES 6B, 13 and 13C.

The suction device and all gates mentioned above move only in response to a keypressing operation, that is, they move once per cycle.

From the lower waiting gate 20 the letter is finally delivered into a continuously moving roller conveyor system 21 in FIGURE 1A, also seen in FIGURES 6B, 13, 14 and 17.

At 22, FIGURES 1A and also 6B, is a box for cancelled letters, that is, letters which the operator has incorrectly coded so that if he has discovered his error in time he can press a further "cancelling" key 24, FIGURES 5 and also 6A, which operates a diverter 23, FIGURES 1A and also 6B, so that the letter goes into the box 22 instead of continuing through the conveyor system 21. Otherwise a letter continues along the roller system 21 and upwards until it is diverted, according to the code requirements, into one or other of the conveyor systems 1 to 5, or if not so diverted it passes to the system 6 unless diverted into a level correction box 16, FIGURES 1A and 6B. This box is to ensure that if any letter, through delay or any other reason, escapes an intended diversion into conveyor systems 1 to 5 it shall not travel on into level 6 and be falsely diverted into a wrong box by the box diverter signal which, as will be understood later, operates on all levels. This arrangement will be further apparent when the coupled diverter system is described later. The diverter 16A, FIGURE 6B, of this box 16 remains in an operating position ready to divert all letters into the box 16, unless the letter is coded to level 6, when the diverter will move, allowing the coded letter to pass along on its way on level 6. It will therefore be understood that diversion to all levels is really the same sort of operation but in the case of level 6 the box 16 is provided to ensure that only letters actually coded for level 6 are allowed to pass on to the conveyor at that level. In previous constructions any letters not diverted to levels 1 to 5 would necessarily be for level 6 so no diverter was provided for that level.

The operator sits at the position 25, FIGURE 5.

Other features of FIGURES 1A and 1B, and also FIGURE 2 will be referred to later as they cannot be understood until the coding, memory, and associated devices have been explained.

Referring now to FIGURES 6A and 6B, the keyboard 9 is shown in FIGURE 6A larger than in FIGURE 5 and the cancelling key 24 is again marked.

The other keys are labelled A to M (letter I being omitted in the case of both sets) but it is not necessary to letter all the keys on the drawing. Any other labelling system could be used but using the early letters of the alphabet is a very convenient arrangement.

Just below the keyboard 9 in FIGURE 6A there is shown at 30 an arrangement of vertical and horizontal lines crossing one another and representing vertical columns and horizontal rows, diagrammatically illustrating the principle of a device called a translator. The lines are labelled in the same way as the keyboard keys the horizontal lines being related to the right-hand keys and the vertical lines to the left-hand keys.

As shown it is supposed that the operator has pressed key D with his left hand and key J with his right hand. Wires marked 26 and 27 lead respectively to a vertical column D and a horizontal row J respectively. At the point of intersection of this column and this row a black triangle 31 is drawn. It will be seen that the operation has translated the dual letter code of the keys into a single location at 31. As there are twelve columns and twelve rows there are one hundred and forty-four such intersections, one for each operative box 7 of FIGURE 1B, although on that figure one hundred and fifty grouped boxes are actually shown, six comprising the last vertical row in the group being spare and able to receive any letters which may have passed owing to some error through a whole conveyor. Broken lines on FIGURE 1B, at the extreme right and marked 350, represent such discarded letters.

In this way any keyboard signal can be identified with a particular box and thus a coded letter can be sent to its proper box by employing suitable devices. The translator thus diagrammatically depicted at 30, FIGURE 6A, is in fact a generally similar grouping of relays as shown in FIGURE 7.

Referring now to FIGURE 7, a number of vertical lines marked A, B and C and so on is shown under a bracket R. A number of horizontal lines similarly marked is shown included in a bracket L. Each line represents a circuit line and the vertical lines have switchbars 54 in them while the horizontal lines have switchbars 55. The lines under the bracket R are those corresponding to right-hand keys A to M while those by the bracket L correspond to the left-hand keys A to M. It will be seen that this arrangement is the equivalent of the arrangement of lines in the translator 30. The switchbars are in fact contacts of relays which become energized as keys are depressed but the term switchbar is used for convenience as the relays are not shown and are not necessary to the understanding of the invention.

Within each square formed by the crossing lines is a relay and each relay is marked by the letters belonging to the corresponding circuit lines for example AA, EM, and so on.

Each line at the bracket L is connected to the negative side of an electrical source, such as a battery 56, while each line under the bracket R is connected to the positive side of the source but with the switchbars 54 and 55 as shown there is no circuit. Any switchbar can be closed to make circuit if a corresponding keyboard key is pressed, for example the switchbars are arranged beneath the keys. If then a left-hand key, say C, is pressed the switchbar 55 on horizontal line C will close and a negative potential is applied to all relays along the C line. If now a right-hand key, say E, is pressed, the switchbar 54 on vertical line E will close and all relays down this line will have a positive potential applied to them. Thus the only possible circuit will be through the relay connected to the line from each of the groups R and L in which the switchbar has been closed. In the example given it will be relay CE and this is hatched to indicate that it is energised. Blocking diodes 57 prevent any possible interaction between codes.

All the relays have one contact each but this is not shown as the closing of a relay contact simply translates the dual letter code into a single location as was explained when describing the translator 30 where the single location was marked 31 in FIGURE 6A, to which figure, and also to FIGURE 6B, the following description now applies.

From the foregoing description it will be seen that the triangle 31 on the translator 30 indicates that a relay contact has been made at this point, and a wire 32 from this point passes to one contact point (shown as a small circle) on a control panel 41 having a large number of contact points including one hundred and forty-four contact points, illustrated by the intersecting points of a grid 40 (shown enclosed in a square drawn in thick lines) of twelve horizontal and twelve vertical lines. The said small circle is on the grid 40 and it can be ascertained by counting that its position on the grid corresponds to the position of the triangle 31 on the translator 30. Every other relay contact of the relays of FIGURE 7 is similarly connected to another contact point on the grid 40. These connections are permanent, that is, each of the one hundred and forty-four relays is connected to one contact point of the one hundred and forty-four contact points of grid 40. More briefly the grid 40 repeats the contact point arrangement of the translator 30.

The panel 41 comprises thirty-four vertical lines and twenty horizontal lines so that there is a very large number of contact points available for almost any purpose, for example, for regrouping for inward or outward sorting, and the arrangement illustrated will now be described. So far twelve horizontal and twelve vertical lines have been utilised for the grid 40. At the top right-hand corner is a thick-lined rectangle 42 enclosing six horizontal lines and twenty-four vertical lines, giving one hundred and forty-four contact points. Any contact point in grid 40 can be connected by a jack-plug-cord device or like 194 to any point in rectangle 42, and this merely results in effect in shifting the contact position from the grid 40 to a point in the rectangle 42. From the rectangle 42 one hundred and forty-four lines such as the line 33 connect said contacts to a unit 34, FIGURE 6B. This unit is called the aggregating and blocking unit and its purpose is explained later. These connections are also permanent.

It will be evident that as the coding keypressing has determined which box a letter is to go to it will also determined the row the box is in, as will now be explained. The arrangement of contacts in rectangle 42 specifically relates to the machine arrangement in respect of rows and boxes and the rectangle may be regarded as the equivalent of the box arrangement of the machine. The six horizontal lines give the six required levels or rows and the twenty-four vertical lines give the box positions along the rows. Since the interconnections between square 40 and rectangle 42 are made by flexible cords, constituting jumper connections, it is possible to arrange them to suit any desired sorting programme as one end of a cord is connected to a point on the square corresponding to a given code and its other end is connected to a point on the rectangle corresponding to a given box. For example, if for a particular programme the letter code CJ from the keyboard is desired to select the fourth box on the second level the contact point in grid 40 corresponding to code CJ is connected to the fourth contact point on the second level in rectangle 42 by a cord 194. If a change is desired, so that CJ represents some other box, the jumper connection is changed accordingly.

Six further contact points on the panel 41 are enclosed in a narrow rectangle 37 and these, which are for row diversion only, can be connected to points in the grid 40 by cords such as the one shown at 188. Six lines, like the one marked 29, FIGURES 6A and 6B, lead from these contact points to the aggregating unit 34 as permanent connections. Thus there are in all one hundred and fifty lines leading from the control panel 41 to the unit 34, FIGURE 6B, one hundred and forty-four like 33 originating in contact points in grid 40 which are joined to points in rectangle 42 by jumper cords 194, and six like 29, similarly originating in square 40 and connected by jumper cords 188 to the contact points in rectangle 37.

The rectangle marked 36 in FIGURE 6B represents a single-revolution clutch, for example the clutch described in United States Patent No. 3,034,621 having an electromagnet which can be energised from a wire like the line 35 to release the clutch so that it makes one revolution. The release of the single-revolution clutch to permit it to rotate is controlled by relay contacts directly associated with the keyboard keys and, to illustrate this, dotted connections to the lines 26 and 27, FIGURE 6A, are shown connecting the two chosen keys to the wire 35. Thus every time two keys, one from each group on the keyboard 9, are pressed the clutch starts, subject however to photo-electric control explained below. In the line 35 two switches 211 and 212, FIGURE 6B, are shown inserted. Each of these represents twelve switches in parallel for each group of keys, the two batches of switches being connected together in series. Thus there is only a circuit to the clutch 36 when two keys, one from each group on the board, are down at the same time. At the right of rectangle 36 is another marked 28 which represents another single-revolution clutch which will obviously start and stop with clutch 36. This clutch is associated with devices at the right-hand side of FIGURE 6B and its purpose will be explained presently. In the line 35 there is also a rectangle marked 213 for a timing corrector (a switch device controlled by the above-mentioned photo-electric control) which has some effect on the instant of clutch starting but as this corrector is also associated with the devices at the right-hand side of FIGURE 6B further explanation is deferred.

Referring for a moment to FIGURES 1A, 1B, and 4, the conveyor systems 1 to 6 and the feeder conveyors 10 and 109 and the conveyors and rollers 17, 19, and 21 run continuously (except that conveyors 10 and 109 are ratchet-operated and subject to detector control as explained later) but all the other devices, briefly described above with reference to FIGURE 1A, operate in cycles as previously mentioned, each cycle starting in response to a keypressing operation and terminating when the clutch indicated by the rectangle at 36, FIGURE 6B, has revolved once.

The clutch can also be operated by pressing a key 200, FIGURES 5 and 6A, to enable letters to be fed stage by stage as far as the key-read window when first starting the machine after the conveyor 10 has been loaded with letters. This key 200, which may be termed the transport key, is also used to send letters with unreadable addresses to a specific box. For this purpose the key is permanently connected by a line 58, FIGURE 6A, to a fixed contact point, shown as a thick square 58A, on the panel 41 and a jumper connection is made from a contact of grid 40 corresponding to the box selected for such discarded letters to said fixed contact point at 58A.

There is a further square 43 provided in the panel 41 providing one hundred and forty-four contacts and immediately to the left of square 43 is another narrow rectangle 159 providing twelve contacts, one for each horizontal line of square 43.

Any one of up to twelve points in square 40 can be connected to any point of rectangle 159 by a cord 195 instead of to a point on rectangle 42.

All these arrangements are to provide for single or group working, that is, whether a particular town will only require one box 7 for a reasonable sorting time or whether more than one box is needed.

For group working a signal from the contact point marked by a small circle in grid 40 is passed by the cord 195 to the point shown in the rectangle 159 going out along line 44 to the centre stud of a rotatable selector switch 189. As the arm 191 of this selector clicks round for each signal received at the said contact in square 40, it connects said point in turn to a different one of twelve lines 192 which lead to contact points in square 43 which are in turn coupled by jumper cords 193 to twelve outgoing lines that is, lines 33 from the rectangle 42. There are twelve such selector switches, eleven others, one for each contact in rectangle 159, being indicated by rectangles 189A. Thus each time a letter for, say, a large city is sorted it will go into a successive box 7 of a group of twelve, though actually this number is high for a single town, but it illustrates the principle adopted.

With this arrangement, and utilising all the selectors fully, the output of the machine can be divided into twelve sections of twelve boxes each, for example the central office of a large city can divide the mail for twelve major divisional or district offices. A selector arm, if it passes over the whole arc of studs, repeats the sequence as the arm is double-ended or if only some early studs are actively employed the arm skips the unused studs and returns to the first immediately it has moved over the active studs.

Before dealing with single working and the consequent description of the rest of FIGURES 6A and 6B two or three minor items will be dealt with.

The cancelling key 24 is connected by lines 118 and 119 to a solenoid 120. FIGURE 6B. This operates the diverter 23 to send a cancelled letter into the box 22. The diverter moves immediately the key is pressed but the letter may not have reached the diverter at the moment so the solenoid remains energised. Eventually the circuit is broken by a resetting device 121 operated from a shaft 63 which is driven from the clutch marked 28 in FIGURE 6B and described in detail later when FIGURES 8A to 8F are discussed. The resetting device operates a switch 122 connected to the solenoid circuit on line 123.

It was explained above that any contact point in rectangle 37 can be connected by a cord to a point in grid 40. Any contact so connected will, on the manipulation of the appropriate keys cause a row diverter to move as the contacts in 37 only relate to rows. The reason for having the contacts in rectangle 37 available as well as those in rectangle 42 is that sometimes it is desirable (for example in testing) to be able to effect row diversion without necessarily effecting box diversion.

The arrangements for single working do not require any of the devices just mentioned when describing group working as the cord 194 takes the connection direct from the corresponding point on the grid 40 to the appropriate point on rectangle 42 and thence to the line 33. Referring now to the question of single working, a line from the point marked in square 40 goes as aforesaid by cord 194, rectangle 42, and line 33 to the unit 34. As there are one hundred and forty-four boxes in rows 1 to 6 there are one hundred and forty-four of the lines 33.

On FIGURE 1B there are thirty sloping lines Cc, Dd, and so on, showing, as explained in detail later, that thirty linkages are sufficient to operate most of the diverters for the boxes on the six conveyor rows, four others, two at the left-hand lower corner, and two at the right-hand upper corner, being operated independently.

As will appear later thirty-six combinations of signals, one from each of two sets of six possible signals are available for the thirty-four signals needed to operate the diverter linkages.

The one hundred and forty-four input lines 33 are therefore grouped on line 38 in common into thirty-four lots of up to six each at 197, the said thirty-four lots being regrouped and then subdivided into two sets of six each at the positions marked 198 and 199. For the six row diverters a line 38A leads to a group at 203.

Eventually each letter coded will result in signals along lines like 39 of which there are actually eighteen, twelve for box signals (that is, six for each of said sets) and six for row signals via the group 203. One wire 39 is shown connected to a solenoid 45 whose plunger 46 operates a bell crank lever 59 pivoted at 47 and whose arm 48 works a slide 49. These parts are only shown diagrammatically in this figure and a proper arrangement in greater detail is given in FIGURES 8A and 8F, but the purpose of these parts is briefly described here. As the slide 49 moves in and out it controls the downward movement of small rollers 50 which, as will be seen, function as switch-operating elements so that if the solenoid 45 is energised as the result of a coding operation one roller is permitted to drop. Each roller has small pins 51 and as the roller drops these enter into slots 97 in a intermittently rotatable device 52 and eventually this roller is transferred to a larger rotatable device 53 and in the course of time the roller will operate a switch, such as the one marked 90, and thereby cause a diverter 8 to direct a letter into a box 7. In a similar manner other rollers in other rotatable devices like 53 will cause a letter to be diverted to a particular row or to another box. To illustrate this a further switch (for a row) is shown at 190. There are eighteen devices 53, one for each of said lines 39, twelve lines in two sets of six from positions 198 and 199 respectively for operating box diverters and six lines from position 203, of which five are for row diverters and one for the level correction diverter 16A which, as previously explained, is virtually the same thing as a row diverter and causes correct letters to be diverted to row 6. All these matters will shortly be described in detail but the above brief explanation is given first as a general outline of the basic principles involved, as FIGURES 6A and 6B are necessarily of a diagrammatic nature. The arrangement of rows and boxes of FIGURE 1 is repeated in FIGURE 6B and the hatched box is the one selected by a code which has resulted in the operation of the switches 90 and 190. The box diverter has therefore been operated by a solenoid 100 and the row diverter by a solenoid 103.

The row diverters have been omitted from FIGURE 1A because of the complexity of the view but they are indicated in FIGURE 6B. At this stage the thirty sloping lines in FIGURE 1B are most conveniently explained. The gate 20 is shown on FIGURE 6B and the path letters follow in the roller system 21 is seen to be inclined to the left. Box diverters are connected together by links 201, FIGURE 6B, which are of varying lengths as indicated by the lengths of the sloping lines in FIGURE 1B. The links slope to the left as shown in FIGURE 6B. The idea is that the distance from the gate 20 to every box whose diverter is operated by the same link is identical. For example with the link 201 shown in FIGURE 6B, the distance from gate 20 to the hatched box is the same as the distance from the gate to the seventh box on row 4. This is because the time interval allowed for transit from the gate 20 to any box of a linked group must be the same, as the signal for any such box will cause operation of the common solenoid 100 which swings the link 201 which thus swings all the diverters attached to it.

The unit comprising the solenoids 45, discs 52 and devices 53 in FIGURE 6B is housed in a compartment 60 of FIGURE 1A.

Further details of the unit will now be described with reference to FIGURES 8A, 8B and 8C. Some reference will also be made to FIGURE 9 which is however mainly an explanatory diagram.

The rotatable device 53 of FIGURE 6B is shown in FIGURE 8A as a disc with a serrated periphery. Pairs of these discs are arranged as shown in FIGURE 9 so as to be able to carry the rollers 50 between them, by the short pins 51 which can rest in the serrations of the discs. There are a number (actually eighteen) of disc pairs fixed on a shaft 61 journalled in a pair of frames like 62 and for each pair of discs there is a rotatable device 52 constituting a roller feeder.

The feeders 52 are all mounted on the shaft 63 and this has a slotted disc 64, FIGURE 8B, of a Geneva drive fixed on one end. Another shaft 65 is driven intermittently by the output shaft 94 of a single-revolution clutch. This clutch is the clutch represented by the rectangle 28 in FIGURE 6B but as it is shown in some detail in FIGURE 8A it is there marked with the general reference 74. Other views of the clutch are given in FIGURES 8D and 8E and it is described below in detail with reference to these figures. The shaft 65, FIGURE 8B, has a driving plate 66 furnished with a roller 67 which drives the disc 64 in the usual manner, a locking disc 68 for the disc 64 being provided as usual. In FIGURE 8B the shaft 94 of the drive from the single-revolution clutch is geared by equal ratio gearing 95, 96 to the shaft 65. Another shaft 99 carries a cam 69. This shaft 99 is driven from the shaft 65 by equal ratio gearing 96, 98. Referring also to FIGURE 8F, above the feeder 52 is a magazine 70 in which rollers 50 are stored, a few being shown. The solenoid 45 and its plunger 46 of FIGURE 6B are shown but as the roller release arrangement is shown in greater detail and, as FIGURE 6B is only diagrammatic, difference references will now be used for the items operated by the solenoid. The plunger 46 is pivoted at 232 to a double armed lever 72 pivoted at 71 on a bracket 73. Slides 75 and 76 are pivotally attached to the lever 72. Thus as the lever 72 is oscillated by the movements of the solenoid plunger the slide 76 will first release a roller from the bottom of the magazine 70 while the slide 75 will retain the rollers above the lowest one. The return movement of the lever 72 will carry the slide 76 back to close the magazine outlet and remove the upper slide from the magazine to permit the rollers to move down one stage. At the time of this roller release, which is virtually simultaneous with keypressing for the coding of the letter to which the released roller appertains, the feeder 52 is still, as the view is intended to show the position a few milliseconds after the single-revolution clutch 74 has engaged by said keypressing and so a roller drops down and its pins 51 drop into the slots 97 of the feeder 52. The subsequent movement by the Geneva drive moves the feeder through 60° and brings said roller round to a position in close proximity to a pair of continuously moving serrated discs 53.

A roller approaches the serrated discs and will eventually (that is, at the next cycle) be pressed into a groove by a lever 77, fixed on a shaft 78 which is pivoted in the frames 62 of the apparatus, and which is slightly rotated for this pressing operation by a spring 79, FIGURE 8B.

The precise moment of this pressing operation is determined by the cam 69, driven from the single-revolution clutch 74. A step in this cam 69 allows a tooth 80 formed on the end of a lever 81, fixed to the same shaft 78 as lever 77, FIGURES 8A and 8F, to drop when the cam is in the position shown in FIGURE 8B and the roller 50, FIGURES 8A and 8F, is in position for transfer from the feeder 52 to the serrated discs 53.

It will be appreciated that if the roller were pressed into the serrated wheel at an instant coinciding with the peak of a serration, the roller could jump either forward or backward into the adjacent grooves, causing quite a variation in machine time, It is therefore necessary to ensure that the roller is only transferred when a groove is adjacent. To achieve this a timing device is incorporated into the circuit. This device is diagrammatically shown in FIGURE 6B and consists of a disc 82 with a number of cut-outs, revolving between a light source 83 and a photo-electric cell 93. The disc is driven by the gears shown at 106 and the ratio is such that the light beam is interrupted for every peak of the serrated wheel 53. A line 107 connects the cell 93 to the timing corrector 213 which operates only when the photo-cell control permits.

During this interrupted period neither of the single-revolution clutches can be started and therefore the roller 50 cannot be transferred from disc 52 into the serrated discs 53 until the ideal moment.

In order to assist the entry of a roller 50 into the serrated discs a reception lever 233 is provided which is pulled outwards from the axis of shaft 61 by a light spring 234, FIGURES 8A and 8F. As the pins of a roller are pressed into the serrated discs the reception lever moves inwards against the pressure of its spring so that the roller axis moves always parallel to itself and the pins enter truly into a pair of serrations.

The single-revolution clutch shown at 74 is the same in principle as the clutch described in United States Patent No. 3,034,621 quoted earlier, except for the arrangement of the parts. Details of the clutch are given in FIGURES 8D and 8E which are now described.

An input shaft 351, FIGURE 8D, coaxial with the output shaft 94 has a clutch driving member 237 formed as a hollow cylinder attached to it while the shaft 94 has a substantially cylindrical driven member 352 fixed to it which is located inside the hollow cylinder. The driven member 352 has several flats on its periphery. Between the driving and driven members is a roller cage 360 holding a roller, such as 353, in the neighbourhood of each flat and capable of receiving a slight rotary movement relative to the two clutch members. Such a movement shifts the rollers slightly so that they lock between the interior surface of the driving member and the flats on the driven member. The cage movement is caused by a toggle 245 comprising arms 354 and 355. The toggle can be bent by a tension spring 356 which extends between one toggle pivot 357 located on an arm 358 fixed to the output shaft 94 and a further toggle pivot 359 on a plate 360A, integral with the roller cage. While the toggle elbow is in the straightened condition, as in FIGURES 8A and 8E, the cage is so placed that there is ample room between the flats on the driven member and the interior surface of the cylinder 237 for the rollers to be free of one of the clutch members. An arm 241 of a lever pivoted at 240 keeps the toggle straightened, as illustrated in FIGURES 8A and 8E, so that the clutch is free and a detent lever 243 engages an end 242 of the first lever, to hold the arm 241 in the position shown. When a magnet 244 is energized, following a keypressing operation, the detent lever is moved and the arm 241 can move, though a light spring, not shown, tends to keep it in position. However the toggle spring is much stronger so the toggle bends and displaces arm 241 and the clutch engages. As soon as the toggle is clear of the arm 241 the latter is pulled back to the position shown, or beyond, by its light spring and it becomes locked in position by the detent lever as the magnet is de-energized. At the end of a revolution of the clutch the toggle is again straightened by the arm 241. To ensure positive stopping in a definite position a disc 249, FIGURE 8B, with a circular-arc depression is fixed to the shaft 99 and a roller 248 on an arm 246 pivoted at 247 and pulled by a spring 250 snaps into the depression at the end of the clutch movement. It is necessary to feed two rollers 50, one in each of different pairs of serrated discs, to cause operation of a box diverter but for row diversion only one roller is needed. These several rollers are all pressed at the same time, each into its pair of serrated discs since these feeding movements follow a keypressing operation.

Each roller fed to the discs moves round with them and is held from displacement by guides 84 concentric with the axis of the shaft 61. During their transit the rollers operate various switches. Two kinds of switches are shown in FIGURE 8A one marked 90 and the other 190. Switches such as 190 are for row diversion to cause letters to be directed to the proper level. Each switch, of both kinds, has an operating spring plate 89, best seen in FIGURE 8C, which is pressed by a screw 88 fitted in an arm 87 of a bell-crank lever pivoted at 86 the other arm 85 being shaped as a kind of tail suitable to be engaged by a roller 50. A spring 91 urges the tail 85 towards the axis of the serrated discs. When a roller passes, the pressure of the screw 88 on the spring plate 89 is relaxed and the switch makes electrical contact.

The switch 90 is of fairly similar construction and the parts described with reference to 190 are the same but movement of the arm 87 alone has no effect on the switch. The arm 87 is freely movable on its pivot 86 and will rotate when a roller passes beneath its tail but the pivot in this case consists of a rod 104 having a lever 187 fixed to it and a tail at some distance along the length of the rod 104 from the position of the lever 187. This displacement is more easily understood from FIGURE 9. Switch construction is plainly shown in FIGURE 8C which shows a switch 90. It will be seen that the rod 104 has a lever 235 fixed to it, pulled by a spring 236. A tail 105 similar to the tail 85 is fixed to the rod 104. The lever 187 is also furnished with a screw like 88 pressing on the spring plate 89 of the switch and unless both screws relax their pressure on the plate the switch cannot make electrical contact.

Switches 90 and 190 are mounted on curved plates 260 at different positions around the axis of shaft 61 and at different positions lengthwise of the serrated disc assembly. At the right hand side of FIGURE 8A one plate 260 carrying a switch 190 is broken away to expose another pair of switches 90 on different plates 260. The scheme can be more easily understood from FIGURES 9 and 10 but these views are diagrams laid out to the best advantage for the necessary explanation. Thus there are sundry levers and switches shown in FIGURES 9 and 10 which correspond functionally to parts in FIGURE 8A but are drawn much more simply to facilitate showing. These switches and other parts bear references having the same numbers as the parts in FIGURE 8A but all with the suffix A.

In due course a roller delivered to the serrated discs in this manner is carried round for about three quarters of a revolution and is then returned to the magazine 70 which comprises a stripper 92 whereby the rollers are removed from the serrated discs.

It was stated in the introduction that existing machines require a time-delay device for every box diverter and that this was unnecessarily complex and expensive and it will now be explained how the number of such devices can be materially reduced for which purpose reference will be made to FIGURES 1B, 2, 9, 10, and 11.

Referring first to FIGURE 1B a number of diagonal lines are drawn across the boxes connecting diverters 8 of various rows. These lines are marked A*a*—B*b*—C*c* and so on. Four diverters, A*a*, B*b*, D*c*, and C*b*, are operated separately. The purpose of these lines is as previously mentioned to indicate that all the diverters connected by any such line will move together. However, only one letter will be in a position to be delivered into a box and all the other diverters will swing idly, but this is of no moment.

As shown in FIGURE 2, a row of solenoids 100 have their plungers 101 connected to the diverters 8 of the boxes of row 1, springs 102 being provided to return displaced diverters to the position shown. Twenty-four such solenoids operate on the conveyor of row 1 and ten more operate on some diverters on the conveyor of rows 2 to 6, see right-hand top corner of FIGURE 1B, so that thirty-four solenoids will jointly operate one hundred and forty-four diverters for the boxes. In earlier constructions there would be one solenoid and one timing drum per diverter so there is a very considerable saving in construction.

Referring now to FIGURE 10, at the upper part are shown six tracks or channels corresponding to the six conveyor levels or rows of FIGURE 1B, each of which requires a diverter as previously explained. These tracks are numbered 1 to 6. Lower down are shown two sets of six tracks or channels each, the upper set being marked in capitals A to F and the lower set in the same, but small letters. Combinations of one capital letter from the upper set and one small letter from the lower set correspond to the markings on the diagonals drawn on FIGURE 1B and the lettering of the four diverters which are operated singly. For example, working from the left-hand of FIGURE 10, where a vertical line constitutes a datum, the combinations in order are A*a*—B*b*—C*c*—D*d* and so on, exactly in the order that these references appear on FIGURE 1B, also working from the left-hand of that figure. These combinations relate to box diverting as will now be explained. The whole of the tracks on FIGURE 10 actually represent the peripheries of the eighteen pairs of serrated discs 53, FIGURE 9, though they are not necessarily drawn to scale, and the arrow at the left indicates their direction of movement.

In order that a box diverter shall be operated two rollers 50 must be released for a key operation as previously mentioned, one in each of two pairs of serrated discs 53. This can be best understood from FIGURE 9 (considered jointly with FIGURE 10), in which figures, as mentioned above the references used in FIGURE 8A are repeated with the suffix A as the parts in question are shown diagrammatically in FIGURES 9 and 10. It will be seen from the right hand end of FIGURE 9 that the spring plate 89A has the two levers 87A and 187A engaging it through the screws 88A and only when the tail 85A is lifted by the roller 50 in channel *c* and the tail 105A is lifted at the same instant by the roller 50 in channel A is the switch 90A allowed to make contact. The micro-switches 90 of FIGURE 8A are indicated in FIGURE 10 by angled lines marked 90A. Thirty-four such lines 90A are on the figure, meaning that the said thirty-four solenoids 100 for box diverters can be operated by these switches.

Referring again to FIGURE 1A and 1B it will be seen that the track combination A*a*, of FIGURE 10 only covers one diverter and so does B*b*. C*c*, however, covers two diverters, one on conveyor 1 and another on conveyor 2. Combination A*c* on the other hand covers six diverters, one on each conveyor, similar arrangements starting at combination E*f* and reaching as far as F*c* so that in many cases a keypressing operation causes six diverters to swing. The remaining diverters are operated in groups of five, four, three, two, while two, namely D*c* and C*b* are operated singly as explained for combination A*a*. The combinations are printed in tabular form in FIGURE 11 where those covering six diverters are enclosed in a thick line while the others show the number of diverters covered by small index figures.

Operation of row diverters is a simpler matter. The same signal as for box diversion feeds a roller 50 to serrated discs 53, see the left-hand side of FIGURE 9, and in due course a row diverter will operate in respect of rows 1 to 5 while, if a letter reaching row 6 is truly destined for row 6, the level correction diverter 16A will operate. The six tracks at the top of FIGURE 10 therefore only have one micro-switch each marked 190A, and the spring plate 89A at the left of FIGURE 9 is of a slightly different shape to the one at the right.

It will be understood from the above description that the eighteen sets of serrated disc pairs 53 provide eighteen channels, the rollers 50 acting as switch-operating elements in these channels. Six channels are for rows 1 to 5 and the level correction diverter 16A for row 6 and thus only require one micro-switch 190A each disposed at a suitable distance around each serrated disc pair, this distance being equal in time to the distance from the waiting gate 20 to the corresponding row diverter. The other twelve channels are divided into two lots of six and a roller in one channel of each lot is required before a switch 90A can be closed. This means that the twelve serrated disc pairs, A*a* and B*b* and so on, each require several switch-operating levers 85A or 105 disposed around their peripheries because in order to operate a box diverter two rollers 50, one in a disc pair of each set, need to simultaneously operate so as to cause a single switch 90A, FIGURE 9, to close. The disposition of the several switches around the disc pairs corresponding to channels *a* to *f* can be followed from FIGURE 10. There are six switches each on channels *a*, *b*, *c* and *f* and five each on channels *d* and *e* making thirty-four in all. To operate these switches there are six levers 105A associated with each of the channels A, B, C, D and five each for channels E and F. The levers 85 for channels *a* to *f* are located by the thirty-four micro-switches already enumerated and need no further comment.

The supply of letters to the machine and their transport to the key read window 18 will now be described.

It will be seen from FIGURE 4 that the feed conveyor 10 meets an upwardly sloping conveyor arrangement marked 109 at its delivery end. This arrangement is more clearly shown in FIGURES 12 and 15 where it will be seen to consist of a series of conveyor belts 110, 111, 112, 113, which operate to bring the leading letter to a substantially horizontal position and to register its edge against a datum formed by a vertical stop 114, located at the position 11 referred to earlier when FIGURE 4 was described. Each belt consists of a number of laterally displaced tapes so that the tapes can intermesh to form a continuous conveying surface. Successive belts move faster from 110 up to the stop 114.

The parts of the upper edges of the letters on the conveyors is indicated approximately by the line 115 and the level of the horizontal first letter by the line 116. Above the stack of letters is a lamp 117 forming part of a photo-electric detector which stops the conveyor 10 when the letter level rises above the line 116. There is of course a certain amount of tolerance in this height, say $\frac{3}{16}''$. The detector consists of a cell 214 which controls an electro-magnet 215. As long as the cell sees the light the conveyor belts continue to move and feed letters but if the feeding rate is greater than the operator can cope with the light is obscured and feeding ceases in the following manner. The magnet is energised all the time the cell is illuminated and it attracts an armature 216 pivoted at 217 and having a stop bar 218 attached to it. This bar can engage a notch in a stop lever 219 (as actually illustrated) when the armature is not attracted to the magnet, stopping the conveyor movement as now explained. The conveyor belts receive their drive from a large pulley 222 on a shaft 221 which is rotated by an intermittent driving device. This is shown as a ratchet wheel 224 fixed to the shaft and actuated by a pawl 223 on a lever 220 which is integral with the stop arm 219. The stroke of the lever 220 can be altered by connecting a link 225, which rocks it, at a different position on an arm 226 of a bell-crank lever pivoted at 227 and whose other arm 228 has a roller 229 on it which engages a cam under the influence of a spring 231. When the stop bar engages the notch in the stop lever the roller 229 is away from the cam and there is no stroke to the pawl 223.

Further movements of the letter will now be described with reference to FIGURES 13 to 17.

After a letter has been arrested by the stop 114, omitted from FIGURE 14, but see FIGURES 12 and 15, it will be lying horizontally and a little above the top level of belts 113 and is seized by a sucker 124 and carried over and deposited in a roller conveyor system 125. This consists of upper rollers 126 which are carried by frames 127 fixed to an oscillatory shaft 128. The shaft is rocked to raise the rollers as the letter comes in and then lowered to press the letter against continuously rotating lower rollers 129 whereupon the letter is slid off the sucker by the conveyor rollers. The letter is thereby delivered on to a continuously moving wide belt 130. The shaft 128 is oscillated by a lever 131 which is operated by a substantially vertical rod 132, FIGURE 14, pivoted to one arm 133 of a double-armed lever which is pivoted at 134. The other arm 135 of the lever has a roller 136 on it which is pulled into engagement with a cam 137 by a spring 138. The belt 130 has pressure rollers 139 supported by flat springs 239 above it and these feed the letter onwards until it is engaged by a further roller conveyor system 140 which feeds the letter onwards until it is again arrested by a stop 150. Letter movement from stop 114 to stop 150 occupies one cycle. The letter is then moved at right angles to its previous line of movement by a pusher 141 whose movements will be described presently. The driving devices of the two roller conveyor systems are arranged in the following manner, the best showing being FIGURE 16.

An electric motor 142, FIGURE 13, has a belt 143 on its pulley 144 which drives an upper pulley 145. A driving belt 146 runs on a smaller pulley 147 which is fixed on a shaft 148 which carries the upper pulley 145 and a belt driving roller 149 for the belt 130, which runs at its other end on a large roller 251. The driving belt 146 drives rollers 152 of the roller conveyor system 140, and also the rollers 129 by a pulley 151 fixed to the shaft 252 of said rollers. It will be noted from FIGURE 16 that the belt 146 follows a very tortuous path following two gaps 153 in a frame 154 which carries the rollers of the systems. These gaps are to allow room for a chain conveyor 155, indicated in FIGURE 15 by its sprocket wheels, which operates the cross pusher 141.

The letters arrive on the rollers 152 at a rapid rate and to prevent rebound from the stop 150 and generally to control each letter there is provided a presser bar system 156. The position of the system is shown in FIGURE 15 but the details are best seen in FIGURE 16. Presser plates 157 are each pivoted at 158 to a link 160 which is also pivoted at 161 to a fixed support 162. At the other end the plates 157 are each pivoted at 163 to a lever 164 pivoted at 165 to a fixed support 166. The lever 164 can be rocked on its pivot 165 by a square rod 167 which is guided by grooved rollers 168 and operated by a cam lever 169, FIGURE 13, and a spring 170. A small spring 171, see FIGURE 16, checks the lever 164 somewhat to prevent bounce. Thus the presser plates move up and down substantially parallel to the face of a letter and check undue movements.

The chain conveyor 155 has a to and fro movement and on the operative stroke the pusher 141 carries a letter across to a belt conveyor system 172 which feeds it to a row of stops 173. The chain conveyor is driven by a toothed pinion 174 fixed to a shaft 175 which carries freely-mounted large rollers 176 for the belts 177 of the system and also has fixed to it driving sprocket wheels 178 for the chain conveyor 155. Beneath the belts are belt support plates 179 which are themselves supported by brackets 180. It will be noted from FIGURES 13 and 13*a* that the stops 173 are upturned parts of the ends of the belt support plates 179.

Referring to FIGURES 13 and 13*a*, the pinion 174 is driven forwards and backwards by a toothed quadrant 181 fixed to a shaft 182 which is journalled in the machine frames and has a lever 183 fixed to it. This lever has a roller 184 which, under the action of a spring 185 engages a cam 186 on a shaft 261. As the shaft 261 rotates, once per cycle, the quadrant is rocked to and fro and the pusher 141 is reciprocated.

The lever 169 is pivoted at 262 and has another lever 263 fixed to it which carries a roller 264 engaging a cam 265. The third cam on the shaft 261 is the cam 137 already described with reference to FIGURE 14.

In FIGURE 15 are shown flat blades 205 lying between the belt support plates 179. These blades 205 are parts of the paddle wheel 12 shown on FIGURE 1A and its construction will now be described in more detail with reference to FIGURE 13. The paddle wheel consists of a rotatable shaft 206 having a five armed spider 207 fixed to each end, and at the end of each spider arm is pivoted at 208 a short lever 209 to which is fixed a bar 210 and fixed to this bar are the blades 205, extending midway between neighbouring belts and their support plates, to carry the letter around.

Each lever at one side of the paddle wheel has an extension arm 253 attached, which has a cam roller 254 at its free end arranged to run in a track 255 of a fixed cam 256 FIGURE 15.

In FIGURES 13 and 13A the centre line of this track and consequently the path of the rollers 254 is shown by a chain dotted line marked 257. Thus, as shown in FIGS. 13 and 15 a letter pushed forward on to the grill formed by the belt system 172 is picked up by the horizontal grill formed by the blades 205 of the paddle wheel, and is transferred in stages, the wheel moving one blade per cycle.

Three letter positions are shown by heavy dashes and the first one is reached at the end of the cycle during which the letter moves from stop 150 on to the belt system 172 and is picked up from that system by the blades of the paddle wheel. The next cycle shifts the letter to the second position where it stands behind the letter in the third position which is at the viewing window 13. At the intermediate position the letter stands on a forked stripper bar 267 with its bottom edge retained by a lip 268 with which each paddle wheel blade is furnished and its top edge resting against the letter in the viewing position since the intermediate letter is thrown forwards by its inertia. The next paddle wheel movement pushes the letter over the stripper bar 267 so that it comes to rest on the viewing window gate 14, the letter previously in that position moving down to the gate 15.

The gate 14 consists of a fixed part 269 formed by the body of the stripper bar, and a pivoted flap 270. This is fixed to a short lever 271 pivoted at 272. A short lever 273 is fixed to the pivot and connected by a link 274 to a cam lever 275 pivoted to the machine frame at 276. A roller 277 on the lever 275 engages a cam 278 on a cam shaft 279 which is intermittently driven, one revolution per cycle.

The gate 15 is of generally similar construction to the gate 14 having a fixed part 280 and a pivoted flap 281 fixed to a short lever 282 pivoted at 283. A short lever 284 is fixed to the pivot and operated by a link 285 attached to one end of a cam lever 286 pivoted to the machine frame at 287 and having a roller 288 which engages a cam 289, see FIGURE 17 as the cam is behind cam 278. When the gate 15 opens the letter contained in it drops into the roller system 19 and is delivered thereby to the lowest gate 20. This gate, which is more easily seen in FIGURE 13C, is almost identical to gate 15 and needs little description except to say that its pivoted flap 290 is operated by a long link 291 pivoted at its upper end to an arm 292, of a bell-crank lever pivoted at 276 and having a roller 293 on its other arm 294 which engages a cam 295, see FIGURE 17 as the cam 295 is behind cam 289 and the roller 293 is behind roller 277 in FIGURE 13.

It will be clear from what has been said that all the gates open at each cycle and every letter is forwarded one stage. As gate 20 opens the letter passes to the roller conveyor system 21. As shown this has a number of rollers on fixed axes 296. These are driven as described below with reference to FIGURE 14. The cooperating pressure rollers 297 are supported on springs 298 fixed to a bracket 299 pivoted at 300 and locked in position by a clamp 301. Thus they can be swung out of contact with the feeding rollers when necessary, say to clear a jam. The pressure rollers of the system at 19 are similarly mounted and need no description.

Referring to FIGURE 18 the sucker 124 is fixed to an arm 302 projecting from a pipe 303. The pipe is located at one pivot point 304 of a swinging link 305 pivoted at 306. At a further point 307 on the link 305 is pivoted a connecting rod 308 whose other end is pivoted at 309 to a gear wheel 310 constituting a crank disc. A link 311 from the pipe axis 304 is pivoted to another swinging link 312 pivoted at 313 to the machine frame. As the gear wheel 310 rotates, the sucker 124 moves in an arcuate path resting at each end, first on the pile of letters at stop 114 and then on the entry to the roller conveyor system 125. Suction is applied through a union 314 which connects by an internal hole (not shown) to the pipe 303. The gear wheel 310 has helical teeth and mates with another gear wheel 315 mounted at 90° to it, this wheel being on a shaft 316 which is intermittently driven by the single-revolution clutch represented by the rectangle 36 in FIGURE 6B. Portions of the actual clutch employed are visible in FIGURES 14 and 15 and will be referred to when the driving arrangements are described.

The drive incorporates a four-bar mechanism at 317 this being described in detail in the copending application Serial No. 825,179, filed July 6, 1954, now abandoned. Its purpose is to permit the lowest possible sucker speed at the pick-up and delivery positions with a fast return movement.

Referring now to FIGURE 14 a dotted line 318 represents a chain which may be regarded as part of the main drive of the machine. The spindles 296 of some of the driving rollers of the roller conveyor 21 are marked and each carries a gear wheel 319, indicated by a dotted circle representing the pitch line of the gear wheel. It will be understood that the pitch line of a gear wheel is the same diameter as the roller it drives. Intermediate gear wheels 320, similarly indicated, cause all the driving rollers of roller conveyor 21 to rotate in the same direction. As the first wheel 320 of the gear train 319—320 is driven by a gear wheel 321 driven by the chain 318 it will be evident that all the rollers coupled to this train rotate continuously. Some of the upper rollers at the right-hand side of FIGURE 14 are driven by a chain 322 and these are geared together by toothed wheels where necessary. The positions of the nip rolls 17 and the rollers of the system 19 are indicated by arrows.

A large gear wheel 323 driven by chain 318 drives the input side of the single-revolution clutch hitherto represented by a rectangle 36 in FIGURE 6B but now having a reference 324 as some parts are shown in FIGURE 15. The clutch body is marked 325 the control magnet 326, stop arm 327 and its spring 328. The body is shown in FIGURE 14 and its central circle 329 represents the input shaft of the clutch. The control magnet and some other parts are housed in a box 330. The drive from gear wheel 323 is through the gear train 331. As this clutch is identical in principle with the one described with reference to FIGURES 8D and 8E, no further description is necessary.

Two wheels of the four-bar device are indicated by 317, as in FIGURE 18, and a large gear wheel 332 drives the belt system 172 through compound gearing to a gear wheel 333 on a roller 334 which is the driving roller for the belts of the system.

The cam shaft 261 is driven from the output side of the clutch by the gear wheel 315, which as aforesaid, is the driver for the sucker motion while the shaft 206 of the paddle wheel is also driven from this gear wheel through a gear wheel 335 and the compound train shown. An outline of the operation of the machine will now be given.

Supposing the machine is in actual operation, a letter lying behind window 18, the "key-read window", can be read and the coding keys pressed. That is why this window is so called, but it has been found by experience that an operator's eyes and memory work quicker than his fingers, so ordinarily he looks at the letter behind window 13 when sorting and while coding the preceding letter at window 18. Assuming a letter is at the gate 15. The operator presses the coding keys and the following events take place.

(1) The signals from each key operate the translator to cause one switch, out of the same number as the number of boxes, to be closed as described with reference to FIGURE 6A.

(2) The pressing of two keys starts the single-revolution clutches subject to the photo-electric control described with reference to FIGURE 6B. Starting the clutch 36, FIGURE 6B, causes every letter in the machine to move forwards one stage. Starting the clutch 28, FIGURE 6B, sets the feeder for the switch-operating elements into operation to act as set forth in No. 3 below.

The clutch-starting also causes the switch-operating elements for the letter preceding the instant one being coded to be pressed home into the serrated discs.

(3) The slotted feeder discs receive appropriate switch-operating elements from the magazines for the instant letter being coded and move through 60° to the position where the elements are to enter the serrated discs.

(4) The gate 15 is opened and the said instant letter drops to the waiting gate 20.

(5) On the next key pressing (for the succeeding letter) the clutches start again, subject however to the photo-electric detector which controls the exact moment of starting so that the pressing of the switch-operating elements for the above said instant letter into the serrations which occurs at the start of a clutch revolution coincides with the presence of serration grooves in exact line with the elements.

(6) The gate 20 opens and the letter drops to the roller conveyor system 21 at the instant the switch-operating elements for said instant letter enter the serrated discs.

In this way the letter starts to move into the roller conveyor system 21 of the machine at the same instant that the switch-operating elements start to travel around with their serrated discs. As the switch-operating elements trip the appropriate switches the letter will have reached a position to be diverted into the corresponding row or box as the case may be.

As will be seen from the description of the apparatus every keypressing causes a letter to be fed into the machine and letters already fed which occupy various positions between the cycles all move on one stage as keys are pressed. Also of course clutch-starting is always subject to the photo-electric control.

It is while a letter is lying at the waiting gate 20 that an operator has a chance to cancel a wrongly coded letter by pressing the key 24 as above-described. This means that he must become aware of his error very promptly as the next keypressing will open the gate.

In starting up the machine the machine is filled with letters, one at each gate up to the key-read position, gate 15, by operating the key 200 several times so that letter movements are executed in stages, each stage following are revolution of the clutch, 36 FIGURE 6B, which starts and goes through a cycle each time key 200 is pressed. The machine is then loaded with letters, one at each position following one stage of movement, and ready for continuous operation and if the operator reads the letter through the key read window and presses the coding keys the letter will pass to the waiting gate and out of the gate at the instant the rollers corresponding to the code of such letter enter into their serrated disc conveyors. Letters will then be distributed from conveyor 21 to their respective conveyors of rows 1 to 6 and on passing along the proper rows will be diverted into their proper boxes.

Thereafter the operator will normally read the address at the viewing window 13 while he is pressing the keys for coding the letter at the key-read window.

In the foregoing text the word box has been used for convenience to denote the container into which a sorted letter is delivered but it will be apparent that any sort of receptacle, compartment or place, will serve the same purpose.

Also the devices referred to as switch-operating elements are described as rollers but it will be seen that any article capable of being conveyed without displacement and able to operate a switch will serve the same purpose. The essential thing is that a switch-operating element must travel from the point of entry into the conveyor device to the point where it is to operate a device which will cause the diverters to act, in a predetermined and unvaried time.

What we claim as our invention and desire to secure by Letters Patent is:

1. In a letter sorting machine of the kind in which letters are distributed according to a code and in which the letters are fed one at a time to a gate which opens to deliver each letter to a first conveyor arranged to carry letters singly in succession, and having means arranged selectively to feed each letter to one of at least two further conveyors, provided with diverters and operating means therefor to cause such letter to be discharged from a conveyor by a diverter at a position depending on the destination of such letter, the said operating means including a time-delay device set into operation at gate opening and arranged to delay diverter operation by a time equal to the transit time of the letter from the gate to such diverter, the improvement comprising common means for simultaneously operating as a group, each group of those diverters which are located on different further conveyors but at the same distance from said gate, as measured by the transit time, whereby a letter on one of said further conveyors is discharged at its proper position by the approprite diverter on said one conveyor, while any diverter simultaneously operated makes an idle movement.

2. A machine as claimed in claim 1 and using a two-symbol code, comprising an electro-magnet for actuating each diverter-operating means, and a switch for each magnet to control its energization, and time-delay devices comprising two groups of magazines, switch-operating elements stored in said magazines and means for feeding an element from one magazine of each group, a conveyor for each said element and means for simultaneously delivering the elements to the conveyors at the instant the gate opens, said conveyors thereupon conveying the elements to positions where they jointly operate one of said switches to energize the associated magnet, whereby the corresponding diverter-operating means is actuated, said positions being such that the transit time of the elements from the instant they are delivered to the conveyors, to said positions, is equal to the transit time of a letter from the gate to its appropriate diverter on one of said further conveyors.

3. A machine as claimed in claim 1, wherein the said further conveyors are superimposed and the common means for operating a group of diverters comprises a link movable in a vertical plane, and means for moving said link to cause diverter operation, said link coupling those diverters which are to operate simultaneously.

4. A machine as claimed in claim 1, wherein the said further conveyors are superimposed and the common means for operating a group of diverters comprises a link movable in a vertical plane, and means for moving said link to cause diverter operation, said link coupling those diverters which are to operate simultaneously, and wherein the diverters of the several rows of superimposed conveyors are arranged in substantially vertical rows and the links slope with respect to said vertical rows so that a link couples diverters in different vertical rows in order that the path from the gate to any diverter of a group is of the same length, irrespective of the difference in height of the various conveyors.

5. A machine as claimed in claim 2 comprising a manually-operated keyboard and mechanism arranged on the depression of two keys, one for each symbol of the code, to release an element from one magazine of each group and to set into operation the means for feeding each element from a magazine and carrying it to the conveyor for said element, said means comprising a single-revolution clutch and a slotted rotatable disc at the base of the magazine and driven by said clutch and closing the base, except when a slot is beneath it to receive an element, whereby an element may be released from a magazine by key depression at any suitable time, said element eventually falling into a slot as the disc continues to rotate and being carried thereby to the said conveyor ready for transfer thereto.

6. A machine as claimed in claim 2, in which the conveyor for the switch operating element consists of a serrated disc and each element has a pin adapted to enter a serration in said disc and comprising means for entering said pin in a serration whereby the element is located on the conveyor for conveyance thereby.

7. A machine as claimed in claim 2, in which the conveyor for the switch operating element consists of a serrated disc and each element has a pin adapted to enter a serration in said disc and comprising means for entering said pin in a serration whereby the element is located on the conveyor for conveyance thereby, and means to feed an element to the serrated disc consisting of a rotatable slotted disc arranged to receive an element from the magazine in a slot and carry the element to a position where its pin can be entered into a serration of the serrated disc.

8. A machine as claimed in claim 2, comprising a closed path for the switch operating elements, extending from the position at which they are fed from the magazine, to the other end of the magazine, and means for moving them through said path, after they reach the switch operating position to return them to the magazine.

9. A machine as claimed in claim 5 in which the conveyors for said elements consist of serrated discs and each element has a pin adapted to enter a serration, whereby the element is located on the conveyor for conveyance thereby, a device for pressing said element to engage the pin in a serration and means for operating said device, driven by the single-revolution clutch, and arranged to operate the device at the start of the clutch rotation, a photo-electric control having a scanner arranged to scan the serrations of a disc and to hold the clutch against movement until a serration is properly placed to receive a pin whereby the transfer of the element takes place at the precise instant necessary for correct entry of the pin into the proper serration.

References Cited in the file of this patent

UNITED STATES PATENTS

| | | |
|---|---|---|
| 2,446,643 | Farmer | Aug. 10, 1948 |
| 2,744,245 | Low | May 1, 1956 |
| 2,795,341 | Dvorsky | June 11, 1957 |
| 2,863,574 | Henig | Dec. 9, 1958 |
| 3,018,009 | Osborn | Jan. 23, 1962 |